United States Patent
Timm et al.

(10) Patent No.: US 10,814,201 B2
(45) Date of Patent: Oct. 27, 2020

(54) DISTANCE CALCULATOR DEVICES AND METHODS FOR GOLF PRACTICE RANGES

(71) Applicant: FlagD, LLC, Carlsbad, CA (US)

(72) Inventors: Dale Timm, Solana Beach, CA (US); Mike Cassiano, Solana Beach, CA (US); Troy L. Parish, San Diego, CA (US); David Walker, Solana Beach, CA (US)

(73) Assignee: FlagD, LLC, Carlsbad, CA (US)

( * ) Notice: Subject to any disclaimer, the term of this patent is extended or adjusted under 35 U.S.C. 154(b) by 0 days.

(21) Appl. No.: 16/566,755

(22) Filed: Sep. 10, 2019

(65) Prior Publication Data

US 2020/0070030 A1 Mar. 5, 2020

Related U.S. Application Data

(63) Continuation of application No. PCT/US2018/043752, filed on Jul. 25, 2018.

(60) Provisional application No. 62/537,312, filed on Jul. 26, 2017.

(51) Int. Cl.
*A63B 57/00* (2015.01)
*A63B 69/36* (2006.01)
*G01S 19/19* (2010.01)

(52) U.S. Cl.
CPC .............. *A63B 69/36* (2013.01); *A63B 57/00* (2013.01); *G01S 19/19* (2013.01); *A63B 2069/3602* (2013.01)

(58) Field of Classification Search
USPC ........................................................ 473/407
See application file for complete search history.

(56) References Cited

U.S. PATENT DOCUMENTS

| | | | |
|---|---|---|---|
| 5,364,093 A | 11/1994 | Huston et al. | |
| 5,636,844 A | 6/1997 | De Buys | |
| 5,664,880 A | 9/1997 | Johnson et al. | |
| 5,685,786 A * | 11/1997 | Dudley | A63B 24/0021 473/407 |
| 5,772,534 A * | 6/1998 | Dudley | A63B 55/61 473/407 |
| 6,093,923 A | 7/2000 | Vock et al. | |
| 8,070,628 B2 | 12/2011 | Denton et al. | |
| 8,355,869 B2 * | 1/2013 | Balardeta | A63B 57/00 701/532 |
| 2002/0052750 A1 | 5/2002 | Hirooka | |
| 2002/0082122 A1* | 6/2002 | Pippin | A63B 57/00 473/407 |
| 2002/0085131 A1 | 7/2002 | Sladen | |

(Continued)

FOREIGN PATENT DOCUMENTS

| | | |
|---|---|---|
| DE | 10021984 | 11/2001 |
| WO | WO 08/111854 | 9/2008 |

OTHER PUBLICATIONS

International Search Report and Written Opinion dated: Oct. 15, 2018 in International Application No. PCT/US2018/43752, published as: WO 2019/023380 on: Jan. 31, 2019.

*Primary Examiner* — Nini F Legesse
(74) *Attorney, Agent, or Firm* — Schmeiser, Olsen & Watts LLP

(57) ABSTRACT

Distance measuring devices and methods are included which may be used to measure and simultaneously display an accurate range of multiple targets such as the flags of a golf practice driving range.

29 Claims, 20 Drawing Sheets

(56) References Cited

U.S. PATENT DOCUMENTS

| | | |
|---|---|---|
| 2006/0271289 A1 | 11/2006 | Piekarz et al. |
| 2009/0082139 A1* | 3/2009 | Hart .................. A63B 24/0003 |
| | | 473/407 |
| 2010/0309220 A1 | 12/2010 | Balardeta et al. |
| 2012/0069501 A1 | 3/2012 | Lai |
| 2013/0144778 A1* | 6/2013 | Jo ........................... G01S 19/19 |
| | | 705/39 |

* cited by examiner

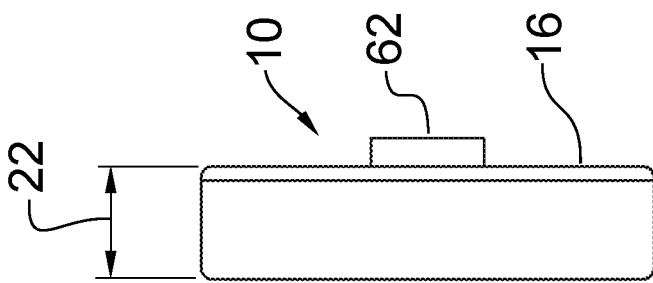
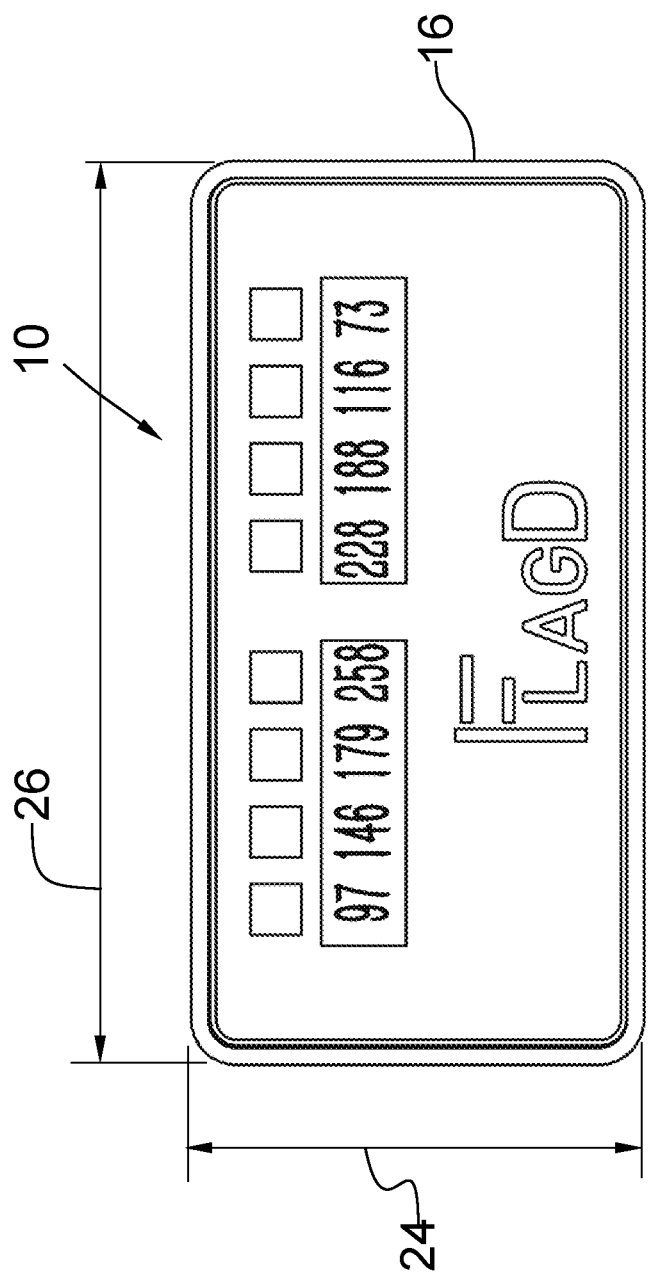
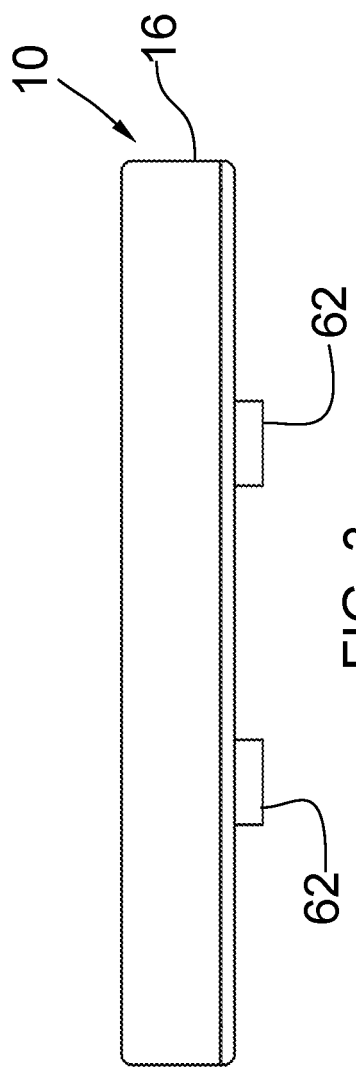
FIG. 4
FIG. 2
FIG 3

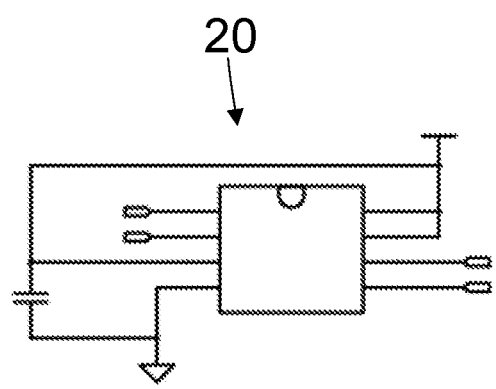
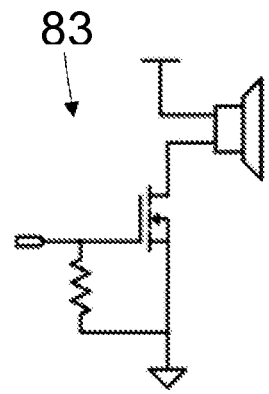
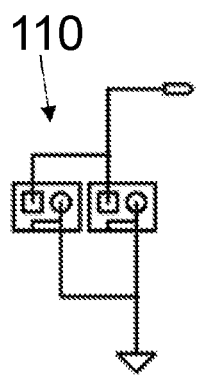
FIG. 22　　　　FIG. 23　　　　FIG. 28
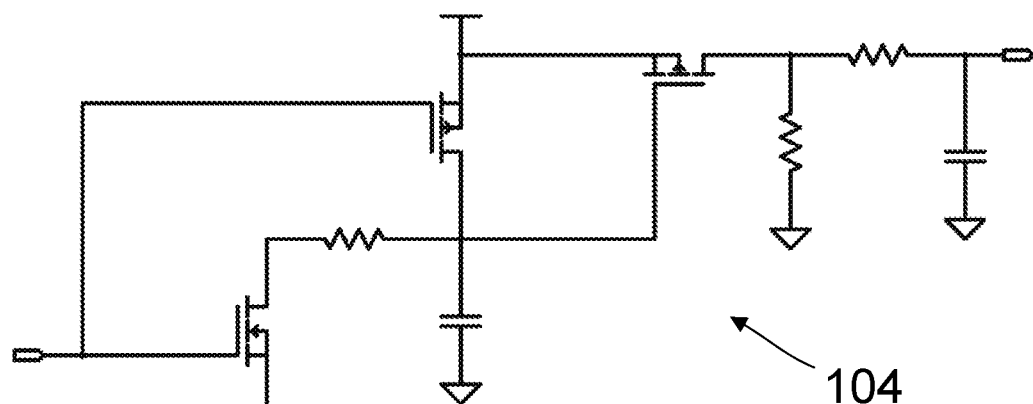
FIG. 24
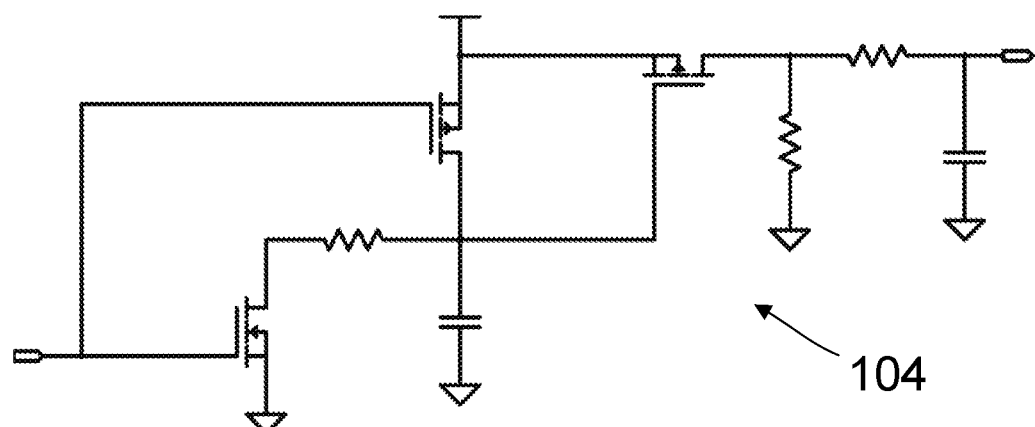
FIG. 25

DISTANCE CALCULATOR DEVICES AND METHODS FOR GOLF PRACTICE RANGES

RELATED APPLICATIONS

This application is a continuation of and claims priority under 35 U.S.C. section 120 to International Patent Application Serial No. PCT/US2018/043752, filed Jul. 25, 2018 and titled "Distance Calculator Devices And Methods For Golf Practice Ranges", by Dale Timm et al., which claims priority from U.S. Provisional Patent Application Ser. No. 62/537,312, filed on Jul. 26, 2017, by Troy L. Parish et al. titled "Distance Measuring Device for Golf Driving Ranges Utilizing GPS Technology And E-Ink Display", each of which is incorporated by reference herein in its entirety.

BACKGROUND

In the sport of golf there is a common problem on golf practice ranges such as golf driving ranges and at golf practice facilities generally regarding accurate and efficient measurement of distances from a hitting position where a player stands and hits the ball to a position of a target which the player is attempting to reach with the hit ball. Often, such targets on a golf practice range are marked with a flag that may be the same as or similar to the type of flags disposed on a flexible pole which are typically used to mark the position of a ball cup on a golf course. The failure to accurately measure the distance to the flag from the golfer's hitting position may lead to inaccurate and ineffective practice sessions and cause golfers to misjudge distances when playing on a regulation course.

In some cases, the distance from the flag to a hitting position may be marked with a yardage plaque that provides the golfer with yardage estimates to each of the flags from the hitting position. This method may work reasonably well so long as the flags remain stationary, however, sometimes it is necessary for a facility to adjust the position of the flags in which case either the yardage plaques are all providing inaccurate measurements or the yardage plaques must be reset at significant burden to the facility.

In addition, even if the flags remain stationary, many golf facilities, and particularly the more high-end facilities, offer their customers the opportunity to practice hitting golf balls from a live grass surface. Because these live grass surfaces degrade rapidly with use, the hitting positions for practicing golfers are often moved about and rotated on a regular basis in order for the grass surfaces to regenerate. As such, even if the flag positions remain stationary over time, the hitting positions at these practice facilities are regularly being moved and, as such, the distances from the hitting positions to the respective target flags are regularly changing. In such cases, golfers may either have to manually step off distances from a yardage plaque or manually calculate distances for each shot based on the position of the yardage plaque that may only be in the general area of the hitting position from which the golfer is hitting the ball. Both of these options are cumbersome which often leads to the golfer guessing at the distance from their hitting position to the flags they are targeting. Solutions such as use of a personal laser range finder or the like may be used with some success, however, this type of solution may also be cumbersome or hard to use and may also require the golfer to buy and transport additional equipment.

What have been needed are easy to use and efficient devices and methods for accurately determining distances from a hitting position of a golf practice range to multiple target positions and displaying these distances in an easy to read format. What have also been needed are such devices and methods that can be provided, maintained and reset by a golf practice range facility with a minimum of cost and manpower.

SUMMARY

Some embodiments of a distance calculator for simultaneously displaying distances to a plurality of targets at a golf practice range, may include a housing, and a memory storage which is disposed on the housing and which is configured to store a plurality of stored target positions. The distance calculator may also include a global positioning system (GPS) receiver, which determines a position of the distance calculator by receiving GPS satellite signal data with an antenna of the GPS receiver. The distance calculator may further include a controller which is in operative communication with the memory storage and GPS receiver and which calculates a distance from each of the plurality of targets to the distance calculator based on respective stored target positions of the plurality of targets that are stored in the memory storage and the location of the distance calculator as determined by the GPS receiver. The distance calculator may further include a plurality of distance displays which are each in operative communication with the controller, which are each disposed on the housing, which each display a display distance corresponding to a stored target position and which each are visible to a user from a position outside of the housing. A target indicator may be disposed on the housing adjacent each of the plurality of distance displays. The distance calculator may also include an update interface which is in operative communication with the controller and which prompts the controller to initiate recalculation of distances between each of the stored target positions to the position of the distance calculator and which prompts the controller to update the display distance values on each of the distance displays based on the recalculated distances.

Some embodiments of a method of calculating and simultaneously displaying a plurality of ranges, distances, or the like measured from a plurality of targets on a golf practice range to a distance calculator, may include positioning the distance calculator at a first target of a golf practice range and initiating GPS calculation of a first target position by receiving GPS satellite signal data with an antenna of a GPS receiver and determining the first target position while the distance calculator is positioned at the first target. Thereafter, the first target position may be stored into a memory storage of the distance calculator in a storage location associated with a first distance display of the distance calculator. After storing the first target position, the distance calculator may be positioned at a second target of a golf practice range. After so positioning the distance calculator, GPS calculation may be initiated by the distance calculator to determine a second target position by receiving GPS satellite signal data with the antenna of the GPS receiver and thereafter determining the second target position while the distance calculator is positioned at the second target.

Once the second target position has been determined, the second target position may be stored into the memory storage of the distance calculator in a storage location associated with a second distance display of the distance calculator. After storing the second target position, the distance calculator may then be used to acquire and store any suitable number of additional target positions and then physically positioned at a hitting position on the golf practice range and an update command of the distance calculator initiated. The determination of the hitting position is thereby made by initiating GPS calculation of the hitting position and receiving GPS satellite signal data with the antenna of the GPS receiver and determining the hitting position with the distance calculator disposed at the hitting position. Once the hitting position has been determined by the GPS receiver, a first display distance measured between the first target position and the hitting position may be calculated with a controller of the distance calculator. A second display distance measured between the second target position and the hitting position may also be calculated with the controller of the distance calculator. Additional display distances may also be calculated if applicable. Thereafter, the first display distance may be displayed on the first distance display of the distance calculator and the second display distance may be displayed on the second distance display of the distance calculator by the controller. Although distances from two target positions are determined and displayed in the foregoing example, other embodiments are not limited thereto. For example, a third target position may be determined and stored, and a third display distance may be measured and displayed. The number of measured and stored target positions and corresponding display distances is not meant to be limited.

Some such method embodiments may also include moving the distance calculator from the hitting position to an updated hitting position after displaying the first display distance and the second display distance. Thereafter, an update command of the distance calculator is initiated by actuation of the update interface. Then GPS calculation of the updated hitting position is carried out by receiving GPS satellite signal data from with the antenna of the GPS receiver. The GPS receiver then determines location coordinates of the updated hitting position while the distance calculator is disposed at the updated hitting position. An updated first display distance measured between the previously acquired and stored first target position and the updated hitting position is then calculated with the controller of the distance calculator. An updated second display distance measured between the previously acquired and stored second target position and the updated hitting position is calculated with the controller of the distance calculator. The updated first display distance may then be displayed on the first distance display of the distance calculator and the updated second display distance may be displayed on the second distance display of the distance calculator by the controller. Any suitable number of additional display distances may also be calculated and displayed.

Certain embodiments are described further in the following description, examples, claims and drawings. These features of embodiments will become more apparent from the following detailed description when taken in conjunction with the accompanying exemplary drawings.

BRIEF DESCRIPTION OF THE DRAWINGS

FIG. 2 is a front view of the distance calculator embodiment of FIG. 1.

FIG. 3 is a top view of the distance calculator embodiment of FIG. 1.

FIG. 4 is a side view of the distance calculator embodiment of FIG. 1.

FIG. 22 shows an embodiment of an EEPROM memory storage.

FIG. 23 illustrates an embodiment of a beeper and associated circuitry.

FIG. 24 shows an embodiment of a soft power circuit.

FIG. 25 shows an embodiment of a soft power circuit.

FIG. 28 illustrates an embodiment of a battery input connector circuit.

Figure 1:
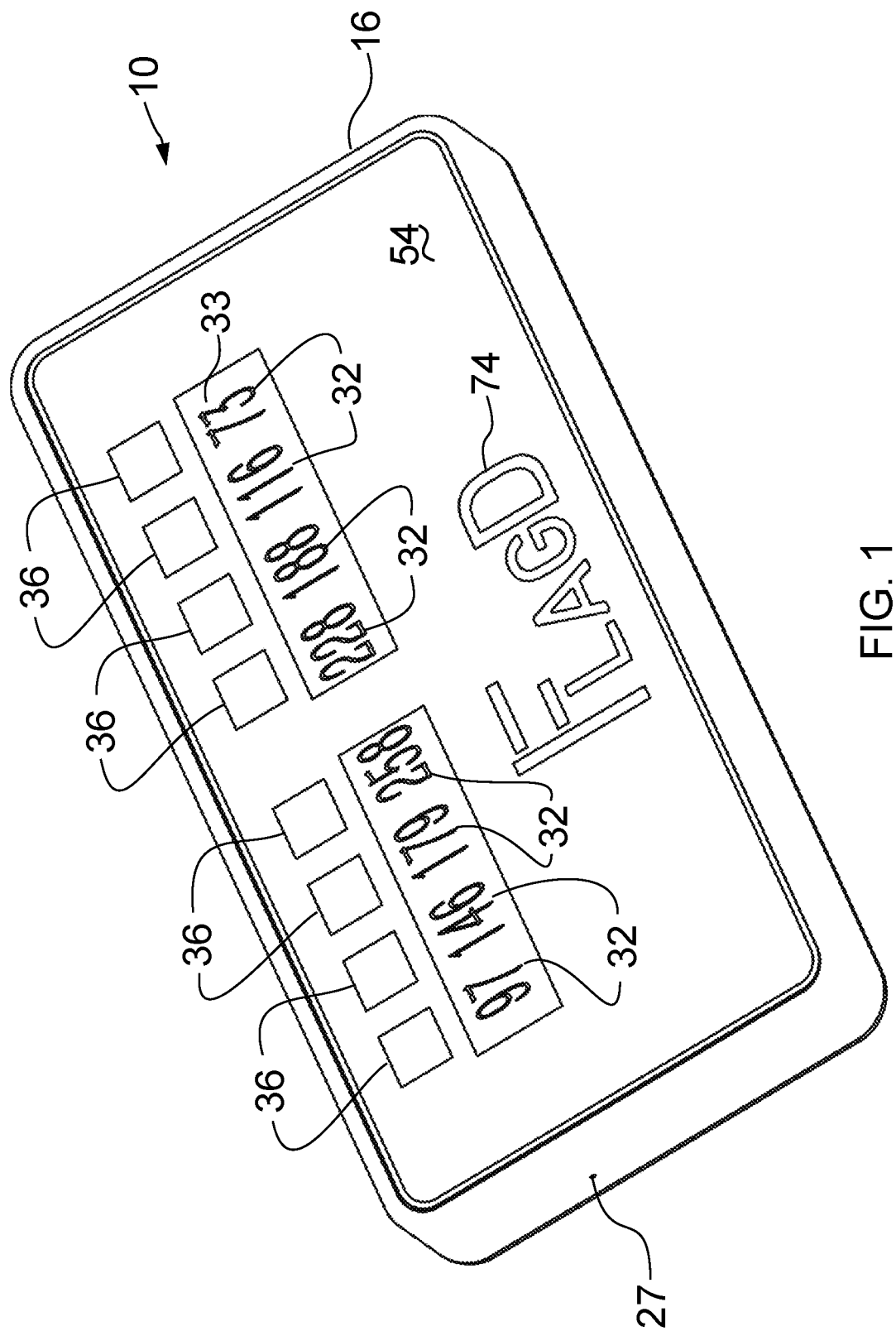
FIG. 1 is a perspective view of a distance calculator embodiment.
Figure 5:
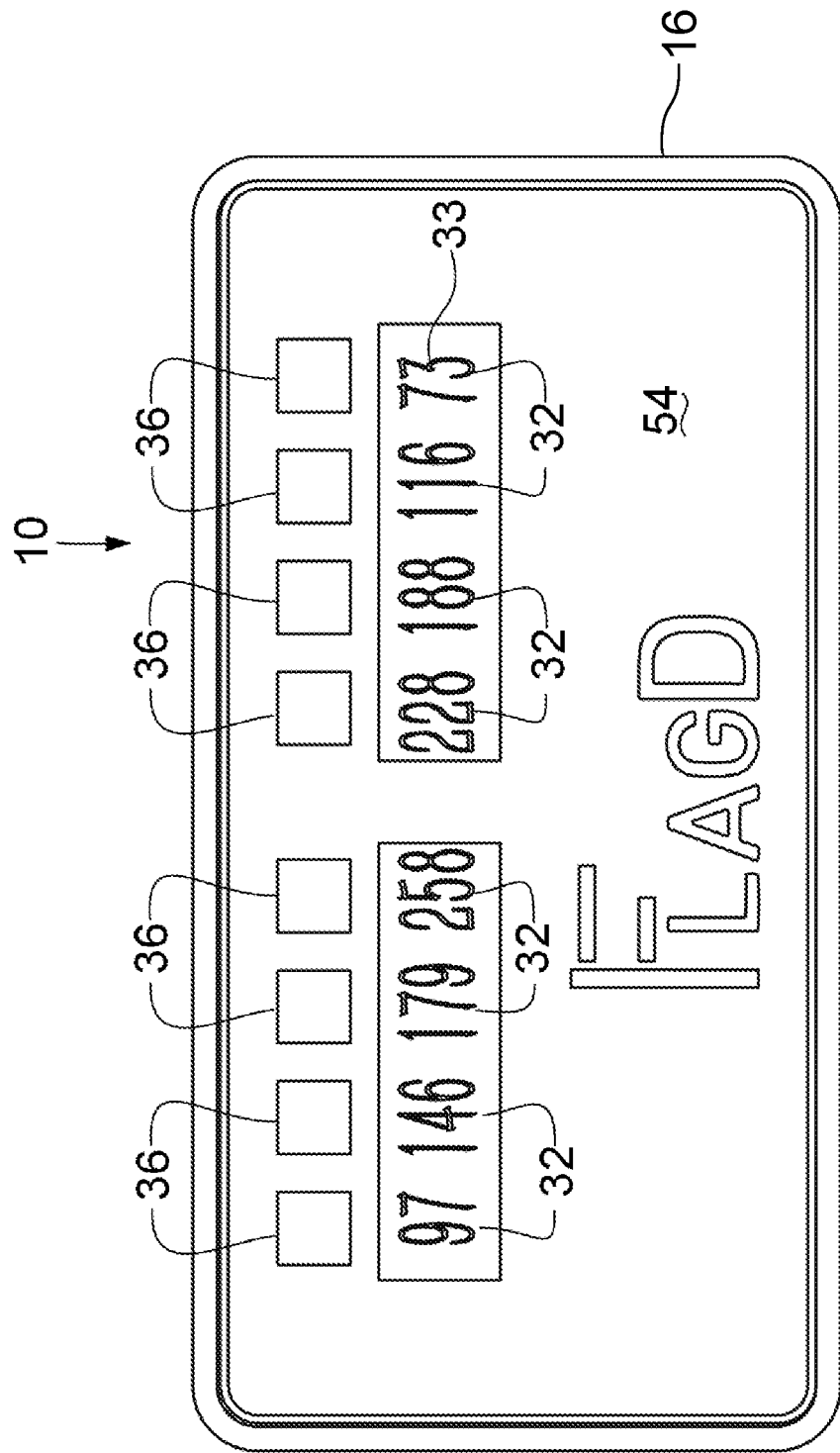
FIG. 5 is a front view in elevation of the distance calculator of FIG. 1.

The drawings are intended to illustrate certain exemplary embodiments and are not limiting. For clarity and ease of illustration, the drawings may not be made to scale, and in some instances, various aspects may be shown exaggerated or enlarged to facilitate an understanding of particular embodiments.

DETAILED DESCRIPTION

As discussed above, there is a need for devices that are designed specifically for use at a golf practice range that automatically and efficiently measure and display the plurality of distances from such a device to the multiple targets on the golf practice range. Generally speaking, golfers at practice ranges either guess at distances, pace off distances from a yardage plaque or board with hand adjusted numbers, or utilize a golf range finder, such as laser range finders, to "shoot" the distance to a target from their hitting position each time. These methods and systems generally don't work well for a variety of reasons including inaccuracy and a requirement for human interaction in order to make measurements each time. In addition, these methods are analog solutions that are not simple to use and rely on a person to either step off distances from a certain position (such as where a yardage plaque is placed) to where they are hitting from, and they require too much time for the average golfer to use effectively during golf practice sessions. Other hand held devices such as laser range finders offer the perception of point and shoot convenience however at a considerable monetary expense and usability is often considered awkward. The distance calculator embodiments discussed herein makes this distance measuring and displaying process extremely simple and accurate for players of all ages and ability by automatically displaying accurate distances from the hitting area to the target with no golfer activation required during the golf practice session. Typically, such hitting positions discussed above in the context of a golf practice range are locations from which a golfer will hit multiple practice shots as opposed to a hitting position on a regulation golf course where the object of the game incentivizes minimizing the number of hits from the same hitting position, with the normal practice being a single hit from each different hitting position on the golf course.

Distance calculator embodiments discussed herein which may be battery powered, may be configured to attach to golf bag stands or other similar surfaces near the golfer while the golfer is standing at a hitting position. In some cases, such distance calculator embodiments display the respective distances from the distance calculator to the various targets located on the golf practice range (typically flags) using GPS technology or the like. In some cases, such distance calculator embodiments may include distance displays having an electrophoretic display (EPD) screen on the top or outer surface to constantly and simultaneously show the plurality of accurate distances being measured. This allows the golfer to accurately gauge their distances to their multiple targets regardless of the hitting position from which they are hitting once the distance calculator has been set for that hitting position. The golfer need only read the display value corresponding to the target flag of interest which is a very simple method from the golfer's perspective to have accurate distance measurements.

In use, embodiments of the distance calculator may determine the location coordinates of the housing of the distance calculator itself using data acquired from the GPS receiver. That location data may then be compared to stored target position data which may be stored within the memory storage within the housing for targets of interest and the distance from the housing of the distance calculator to each target is displayed. In a typical application, the distance calculator may be located at each hitting position such as the tee at a golf practice range. When the location of a hitting position is moved as discussed above, the distance from the distance calculator to the targets is also generally changed. In these situations, the distance calculator may be updated to display the new display distances by using a golf tee or other elongated object capable of pressing a recessed update interface button that will cause a controller of the distance calculator to automatically determine a new position of the housing using the GPS receiver, recalculate the distances to each target, and update the display of each display distance corresponding to each flag. Typically the hitting positions are set up by groundskeepers in the morning at which time they will update all of the distance calculators with no further updates required for the day.

Embodiments of the distance calculators discussed herein, such as the distance calculator embodiment 10 shown in FIGS. 1-7, may be directed to embodiments for simultaneously displaying distances to a plurality of targets 12 (see FIG. 12) at a golf practice range 14. Such distance calculator embodiments may include a housing 16, a controller 18 disposed on the housing 16, and memory storage 20 such as, for example, electrically erasable programmable read-only memory (EEPROM) which may be disposed within an interior volume of the housing 16 in operative communication with the controller 18. For elements of distance calculator embodiments 10 discussed herein which are referred to as being in operative communication, operatively coupled or the like, such elements may be coupled by any suitable conduit or conduits such as conductive wires, fiber optic cables, wireless links or the like. The memory storage 20 may be configured to store a plurality of stored target positions as well as other data. The housing 16 of such distance calculator embodiments 10 may have an enclosed hollow configuration with a rectangular shape having a thickness as indicated by arrow 22 in FIG. 4 that is less than a height as indicated by arrow 24 or width as indicated by arrow 26 as shown in FIG. 2. For some embodiments, the housing 16 may have a height 24 of about 80 mm to about 120 mm, a width 26 of about 150 mm to about 300 mm and a thickness 22 of about 15 mm to about 40 mm.

The enclosed hollow configuration of the housing 16, which may be weatherproof or sealed in some cases, may also include a vent hole 27 that provides communication between the interior volume of the housing 16 and the ambient atmosphere surrounding the housing 16 to enable equalization of air and/or water vapor pressure between the air inside the interior volume of the housing 16 and the outside ambient. Such pressure equalization may be useful in order to reduce stress on sealing materials of the housing 16 in some instances. In some cases, in order to maintain a waterproof or weatherproof configuration, the vent hole 27 may include a hydrophobic breathable cover material 69 (see FIG. 7) that is sealed to the structure of the housing 16 over the vent hole 27 on an interior wall of the case top plate of the housing 16. Waterproof breathable materials such as expanded polytetrafluoroethylene (Gortex®) or the like may be used for the cover material 69.

Figure 7:
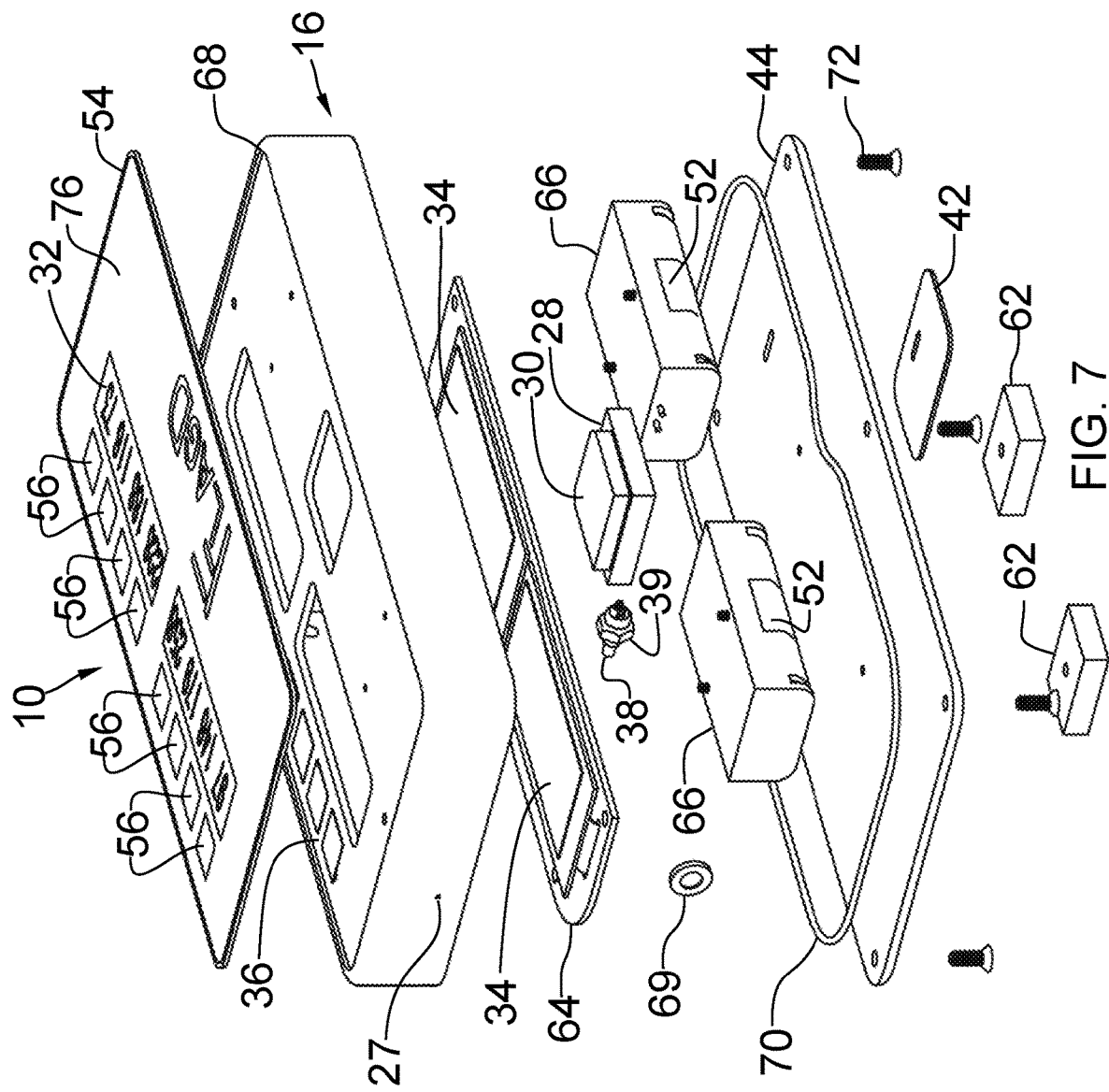
FIG. 7 is an exploded view of the distance calculator embodiment of FIG. 1.
Figure 8:
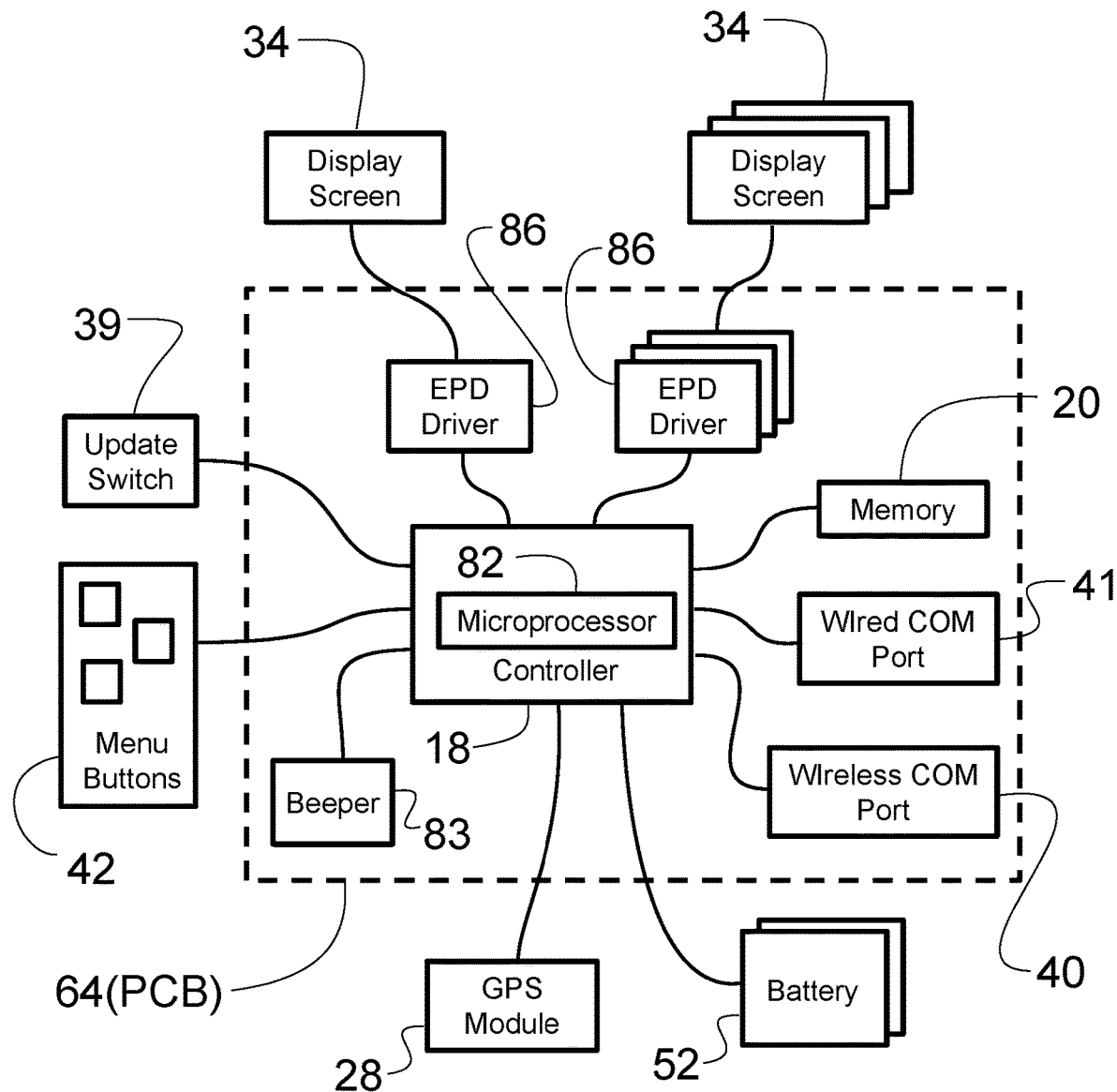
FIG. 8 is a schematic view of certain electronic components of the distance calculator of FIG. 1 including a PCB embodiment, display screen embodiment and GPS receiver embodiment of the distance calculator embodiment of FIG. 1.

Referring to FIGS. 7 and 8, a GPS receiver 28 which is in operative communication with the controller 18, may be used determine a position of the distance calculator 10, or housing 16 thereof, by receiving GPS satellite signal data from GPS satellites with an antenna 30 of the GPS receiver 28, which may be an integrated antenna 30. In some instances, the GPS receiver 28 may receive GPS satellite signal data from one or more GPS satellites. In some cases, the GPS receiver may receive GPS satellite signal data from at least three GPS satellites in order to generate reliable position data. An example of such a GPS receiver 28 may include a model EM 506 manufactured by Globalsat WorldCom Corporation located in New Taipei City, Taiwan.

Although the distance calculator embodiments 10 discussed herein include the use of a GPS receiver 28 in order to acquire position data from an external signal received by such devices, other location systems and methods such as radiofrequency triangulation including Bluetooth/WiFi® triangulation, cell phone tower signal triangulation, or acoustic or optical signal time of flight method and the like are also contemplated and may be used as substitutes for the GPS receiver embodiments 28 discussed herein.

The distance calculator 10 may also include a plurality of distance displays 32 which are each in operative communication with the controller 18, which are each in secured relation to the housing 16, which each display a display distance value 33 corresponding to a stored target position of a respective target 12 and which each are readily visible to a user from a position outside of the housing 16. For some embodiments, the distance displays 32 may be part of a zone or subset of a larger display screen 34 as shown in FIG. 7. A target indicator 36 may be disposed on the housing 16 adjacent each of the plurality of distance displays 32 and may provide a visual reference to a user that facilitates correlation of a given distance display 32 with a corresponding target 12.

An update interface 38 which is operatively coupled to the controller 18 may be used to prompt the controller 18 to initiate calculation or recalculation of the position of the distance calculator 10 by the GPS receiver 28. The update interface 38 may also be used to prompt the controller to initiate calculation or recalculation of distances between each of the stored target positions to the position of the distance calculator 10, or housing 16 thereof. Such calculations may be carried out by the microprocessor 82 of the controller 18 in some cases. The update interface 38 may also be used to prompt the controller 18 to update the display distance values 33 (see FIG. 1) on each of the distance displays 32 based on the recalculated distances between the distance calculator 10 and targets 12 for which target position values are stored in the memory storage 20 or any other suitable location within the distance calculator 10. For such distance calculator embodiments 10, the update interface 38 may include an update switch 39 disposed on the housing 16 as shown in FIGS. 7 and 8. In some cases, the update switch 39 of the update interface 38 disposed on the housing 16 may be a recessed switch 39 which is positioned within the housing 16 so as to permit actuation of the recessed switch 39 with a point of a golf tee or similar instrument as shown in FIG. 7.

Figure 6:
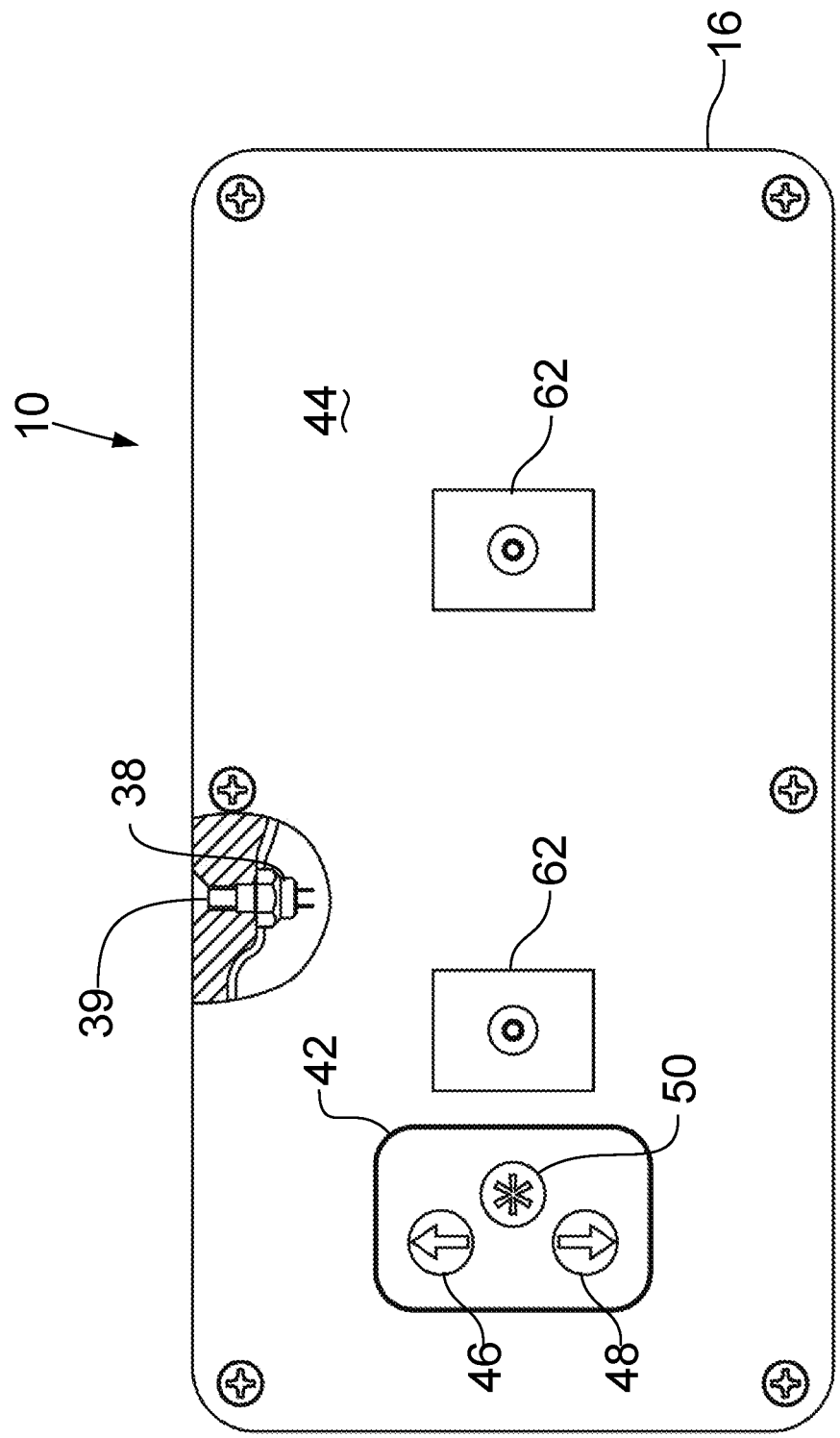
FIG. 6 is a rear view of the distance calculator embodiment of FIG. 1.

In some instances, the update interface 38 may include a remote control (not shown) which utilizes a wireless link, such as the wireless communication link 40 shown in FIG. 8 which may be in operative communication with the controller 18 and in wireless communication with the remote control. Some distance calculator embodiments 10 may further include an auxiliary user interface 42 which may also be operatively coupled to the controller 18. For the distance calculator embodiment 10 shown in FIG. 8, the auxiliary user interface includes a membrane switch 42 as shown in FIG. 6 disposed on the rear or bottom plate 44 of the housing 16. The membrane switch 42 may include several different buttons that may be used for toggling through various menu selections and selecting menu choice options. For the membrane switch embodiment 42 illustrated in FIG. 6, an "up" button 46, "down" button 48 and "enter" button 50 may be included on the membrane switch 42. The up button 46 and down button 48 may be used to advance through menu options and the enter button 50 may be used to select displayed menu choices in some cases.

As discussed above, in some instances, each distance display 32 may have an associated target indicator 36 disposed adjacent thereto. The target indicators 36 may be used as a quick reference label by an end user of the distance calculator 10 for each distance display 32 so that the user of the distance calculator 10 can determine at a glance which target 12 distance is being displayed by each respective distance display 32. In some cases, each target indicator 36 may include a color coded emblem such as a sticker, painted block or the like. For such embodiments 36, each color coded emblem may correspond to a color coding of an actual physical flag of a target 12 on the golf practice range 14 corresponding to a stored target position for which the distance has been displayed. In other cases, each target indicator 36 may include a pattern such as stripes or a checkerboard that represents a matching pattern of a corresponding flag of a target 12. In other cases, each target indicator 36 may include a written character that represents a matching written character of a corresponding target or flag 12. For example, such written characters may include numbers, letters, symbols or the like as shown, for example, in FIG. 12, where each target flag 12 is labeled with a number and the range calculator 10 includes a distance display 32 for each target 12 with a target indicator 36 having a number corresponding the respective target flag 12. In addition, symbols representing natural or man made features on the golf practice range 14 may be used such as symbols representing trees, out buildings, water features or the like. In this way, certain target locations and corresponding distance displays 32 may be identified by the feature they are close to rather than an identifier disposed directly on the target 12. Such features may be extended to creating a scaled down spatial representation of the entire golf practice range 14 or portions thereof on the face plate 54 of the distance calculator 10. For such distance calculator embodiments 10, a scaled down map or visual representation of the golf practice range 14 may be printed onto the face plate 54 with the relative positions of the distance displays 32 on the face plate 54 correlating to the relative positions of the targets 12 on the golf practice range 14 at which the distance calculator 10 will be used. This scaled down representation of the golf practice range 14 could also be electronically displayed on a single display screen 34 for some embodiments.

In certain circumstances, power management for the distance calculator embodiments 10 may be very useful in order to extend the life of a stored power source such as a battery 52 including rechargeable batteries that may be used to power the electronic or electrical components of the distance calculator 10. Extending battery life may be useful to reduce maintenance time and cost for a commercial end user that may be using a large number of the distance calculators 10 for a particular golf facility. As such, for some embodiments 10, each of the distance displays 32 may include a screen that continues to display a display distance yardage value 33 even after power to the distance display 32 has been shut off or eliminated. Examples of such distance display embodiments 32 may include a microencapsulated electrophoretic displays or the like. A specific example of such an electrophoretic display may include a model E2287CS091 manufactured by Pervasive Displays Company located at Tainan City, Taiwan. Such electrophoretic type distance displays 32 may also be amenable to outdoor use because they may be visible to a user wearing polarized eyewear which is common to golfers and other outdoor sports enthusiasts. For some distance calculator embodiments 10, the plurality of distance displays 32 may be disposed on a single display screen 34. That is, a single display screen 34 may include a plurality of display fields, with a separate display distance value being displayed in each of these fields.

For the distance calculator embodiment 10 shown in FIG. 7, there are two separate display screens 34, each of which includes four distance displays 32. In order to further conserve power during operation, the controller 18 may be configured to update the display distance values 33 for each of the distance displays 32 of a first display screen 34 while a second display screen 34 is powered down and then shut off the power to the first display screen 34. Power may then be supplied to the second display screen 34 while the first display screen 34 is powered down, the display distance values 33 of the distance displays 32 of the second display screen 34 updated and then power shut off to the second display screen 34. A similar sequence may also be used for instances wherein each distance display 32 is disposed on a separate display screen 34.

In order to include an associated target indicator 36 for such an arrangement, an outer face plate 54 as shown in FIG. 7 with a plurality of display windows 56 having positions corresponding to a position that is disposed over each of the respective distance displays 32 of the display screen or screens 34 may be disposed over such a display screen or screens 34. In addition, a plurality of display screens 34 may be used such that the plurality of distance displays 32 are disposed on a plurality of display screens 34 as shown in FIG. 7. In some cases, the plurality of distance displays 32 may be each disposed on a separate display screen 34. For the distance calculator embodiment 10 shown in FIG. 5, there are a total of two display screens 34 with each of the two display screens 34 including four associated distance displays 32 for a total of eight distance displays 32 and eight associated target indicators 36 printed onto the face plate 54 adjacent the associated transparent display windows. In some cases, the distance calculator 10 may include about 2 distance displays 32 to about 20 distance displays 32, more specifically, about 5 distance displays 32 to about 10 distance displays 32. In addition, a corresponding number of target indicators 36 may be associated with such numbers of distance displays 32.

In many cases, the distance calculator embodiments 10 discussed herein may be repeatedly mounted to and removed from a surface in order to make the distance calculator 10 available for use during hours of operation of the golf practice range 14 but then brought back inside the clubhouse during hours of non-operation in order to minimize exposure to the elements even though the housing 16 of the distance calculator embodiments 10 discussed herein may be configured to be weatherproof, waterproof etc. In some cases, the distance calculator embodiments 10 may be removably mounted to a surface of an object such as a golf bag stand 11 or the like that is disposed directly adjacent a hitting position 60 of the golf practice range 14 as shown in FIGS. 13-16, and then later removed from such a surface and brought back indoors during hours of non-operation. In some cases, the distance calculator embodiments 10 may be robustly mounted to a surface to discourage theft. As such, some distance calculator embodiments 10 may include a mount 62 such as a mounting screw, mating hook and loop surfaces or materials, a magnetic mount, a spring latch and mating slotted boss mount or the like. An example of a magnetic mount embodiment 62 that may be removably secured to a mating surface such as a magnetic plate 63, such as a steel magnetic plate 63, or any other suitable surface. Such a magnetic plate 63 may be secured to a surface of the golf bag stand 11 with an angled mounting bracket 61 that provides a predetermined tilt for the distance calculator 10 that facilitates reading of the display distance values 33 and may further prevent pooling of rain or irrigation water on the distance calculator embodiments 10.

As discussed above, some embodiments of the distance calculator 10 may include a communication link 40 that is operatively coupled to the controller 18. Such a communication link 40 may be configured to transmit stored target position data stored within the memory storage 20 to a communication link 40 of another distance calculator 10. The other distance calculator 10 or any of the distance calculator embodiments 10 discussed herein may be configured to receive such stored target position data with such a communication link 40. For some embodiments, the communication link 40 may include a wireless link such as a Bluetooth® wireless link or the like, for example or an optical wireless link using LEDs and photodetectors such as irDA for example.

Referring again to FIGS. 7, 8 and 17, and as discussed above, distance calculator embodiments 10 discussed herein may include the GPS receiver 28, one or more microencapsulated electrophoretic display screens 34, and a processor such as a microprocessor 82 which may be operatively coupled to a main printed circuit board (PCB) 64 of the controller 18. Two battery holders 66 with two pairs of AA batteries 52 may also be connected to the PCB 64 to provide power for operation of the electrical and electronic components of the distance calculator 10. Additional connections to the PCB 64 may include the externally mounted membrane switch 42 and a mechanical update switch 39 that may be secured to the PCB 64 in some cases or in other cases secured directly to the case top 68, case bottom 44 or any other suitable location. Components such as the GPS receiver 28 and battery holders 66 may be mounted inside of the housing 16 or on the external surface of the housing 16. The housing 16 may be waterproof, weatherproof or water resistant generally and may include the case bottom 44, a case top 68, a case assembly O-ring 70, outer face plate 54, vent hole 27, hydrophobic breathable cover 69 and six case assembly screws 72. The faceplate 54 with transparent display windows 56 and artwork 74 may be affixed to the outer surface 76 of the case top 68. The assembled unit may be mounted to an external surface using the mount 62 such as the magnetic mount shown, a unit mounting screw threaded into the bottom case or any other suitable detachable securement method. In some cases, functions of the membrane switch 42 and the update switch 38 may be merged thereby eliminating one of them, but usability may be altered. Potential modifications could include adding or changing the type of battery 52, such as including rechargeable batteries 52, and/or size and/or adding a solar cell (not shown) to charge the batteries 52, and/or adding a connector interface to charge batteries using an external charger.

Figure 9:
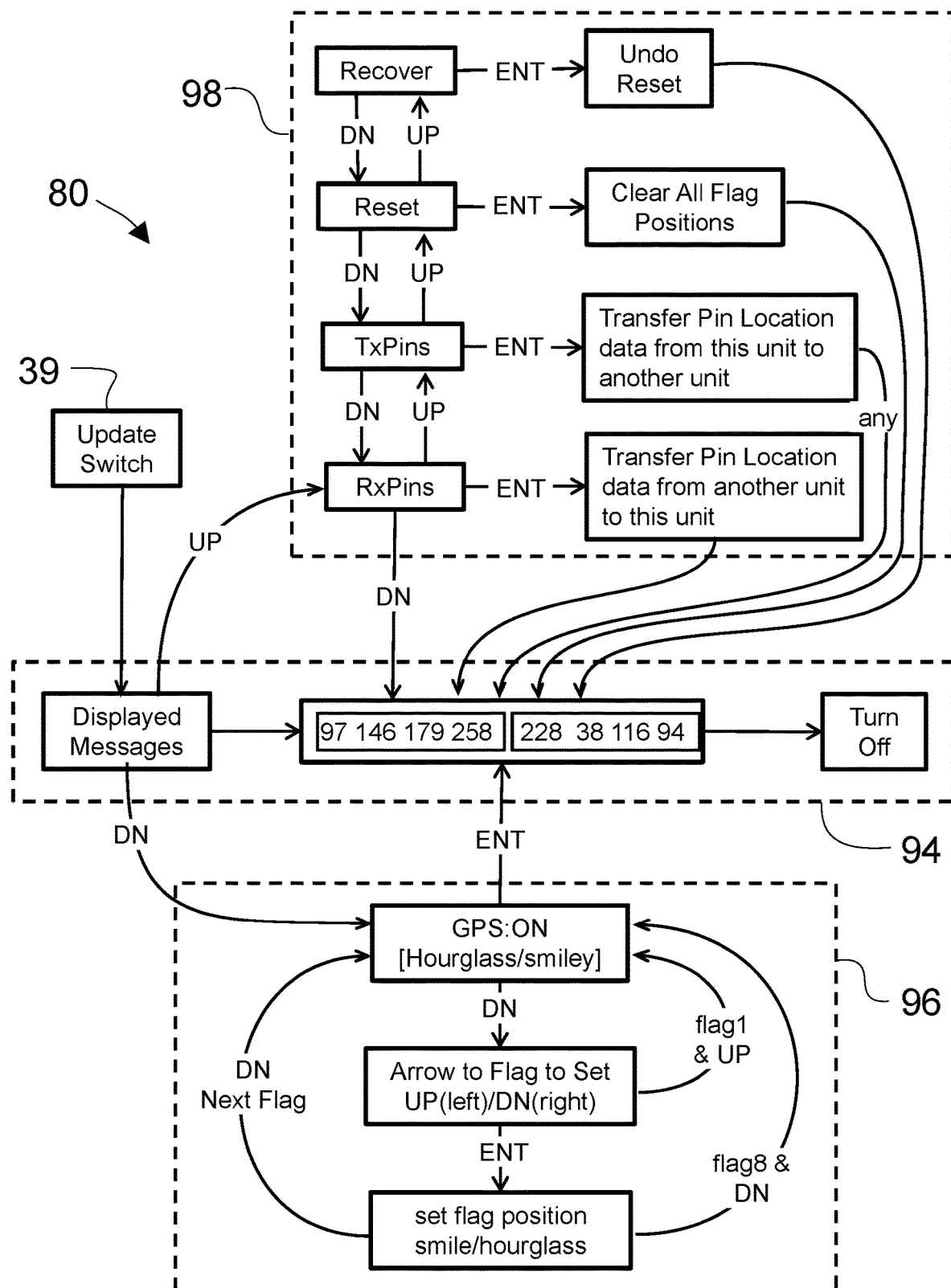
FIG. 9 is a flow chart indicating menu control by with the update interface switch and auxiliary interface buttons of the membrane switch.

The distance calculator 10 may also have additional functionality which may be accessible using the membrane switch 42 disposed on the housing 16 and a menu structure visible on the screens of the distance displays 32 as shown in the menu function flow chart embodiment 80 shown in FIG. 9. The additional functionality may enable the distance calculator 10 to acquire and store the location coordinates of each remote fixed target position (flag) 12 and to initiate wireless transfer of these stored target position coordinates to other distance calculator units 10 for initialization. The additional functionality may also enable altering the configuration of the distance calculator 10 by changing internal algorithm parameters and/or changing user interface settings such as display font type.

As discussed above, some distance calculator embodiments 10 may be powered by two pairs of AA batteries 52 and the electronic components may be specifically chosen and configured for low power consumption with the objective of very long product operation between battery changes. The microencapsulated electrophoretic display embodiments 34 are typically well suited for this application due to the extremely low energy required to update and maintain the display distance values 33. To further prevent unnecessary power consumption, additional circuitry may be provided in controller 18 to electrically shut off and decouple functional circuit elements when not in use.

Figure 12:
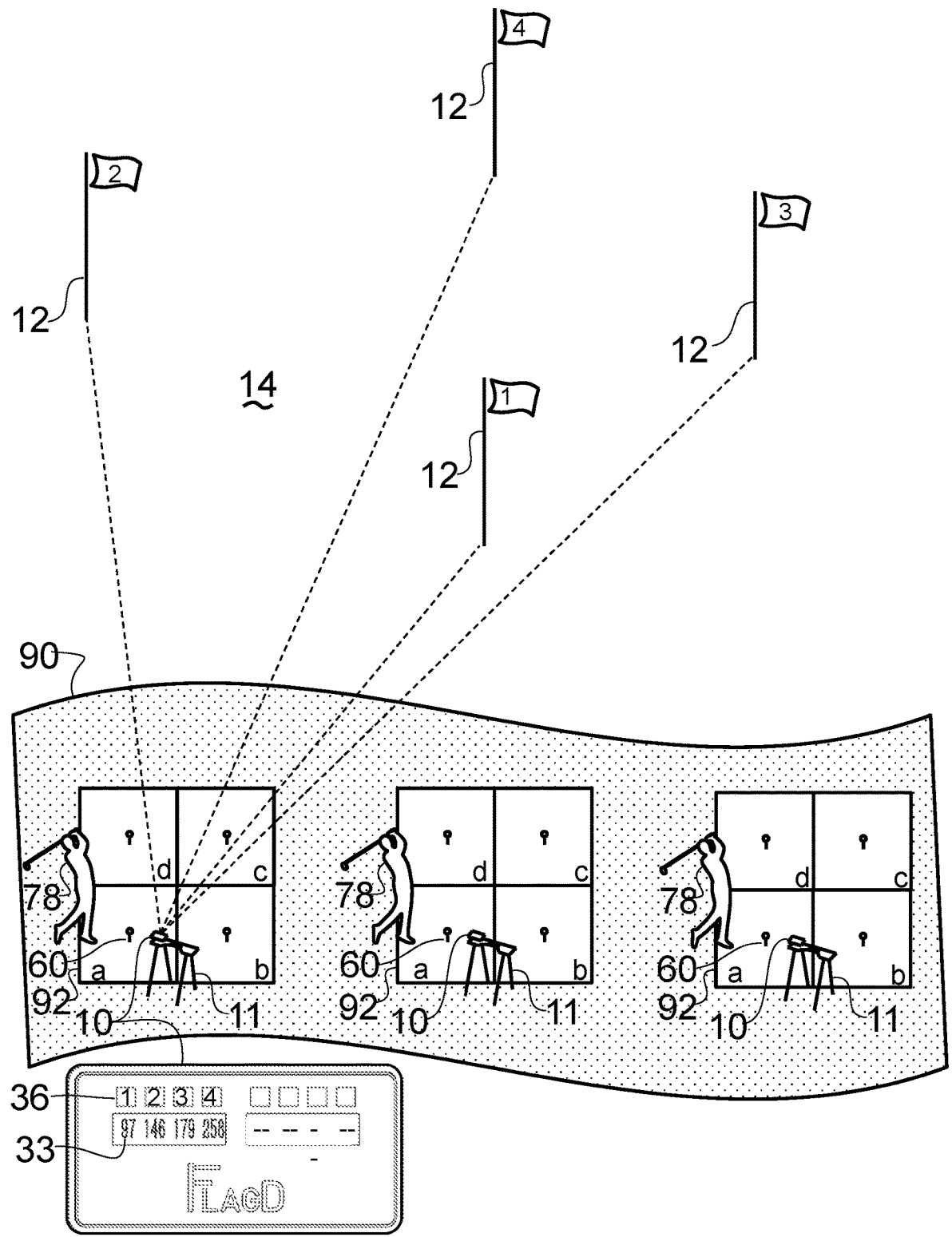
FIG. 12 is a schematic representation of a golf practice range with multiple distance calculator embodiments disposed adjacent hitting positions thereof.
Figure 13:
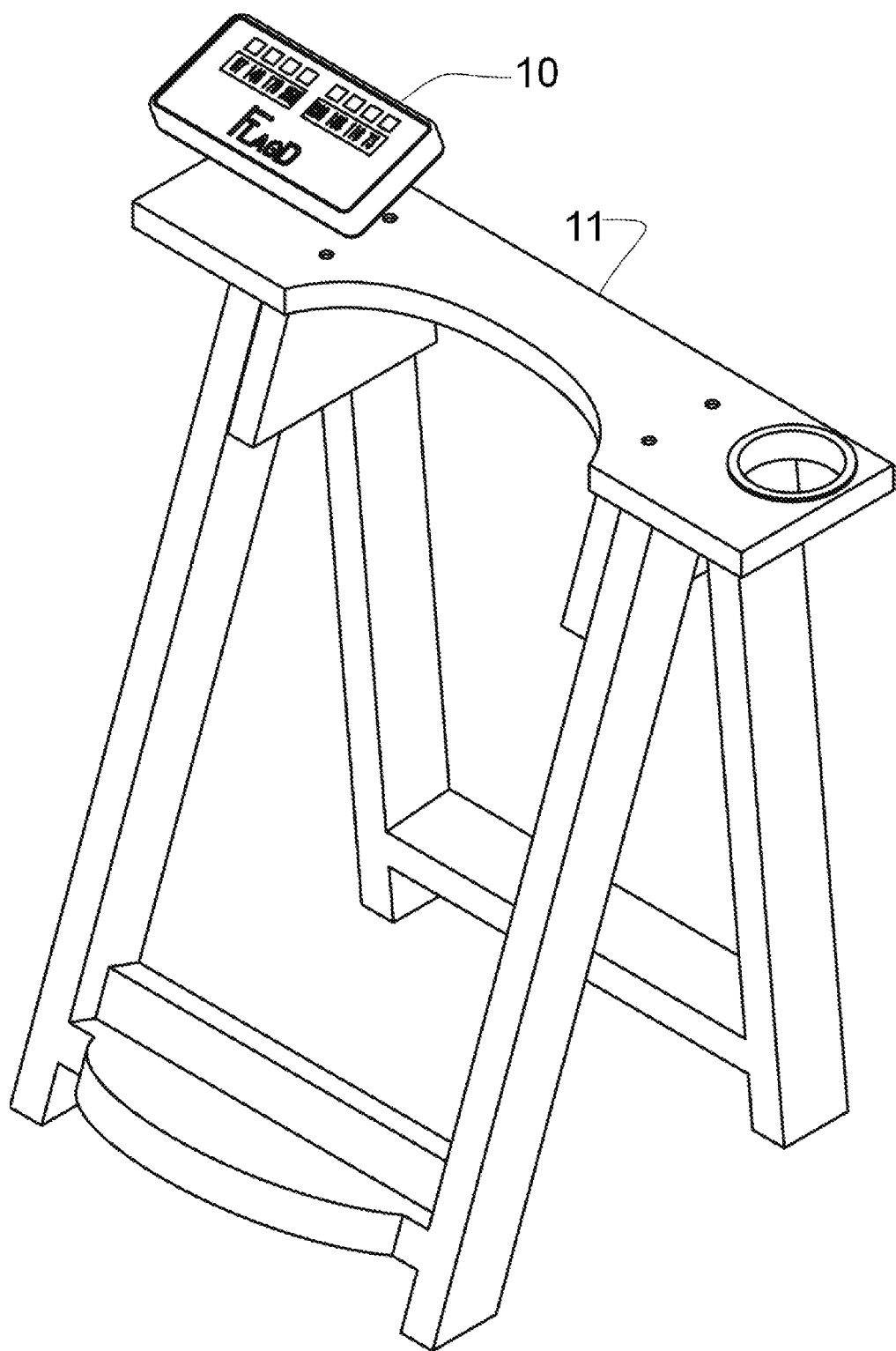
FIG. 13 is a perspective view of the distance calculator embodiment of FIG. 1 releasably secured to a golf bag stand embodiment.
Figure 14:
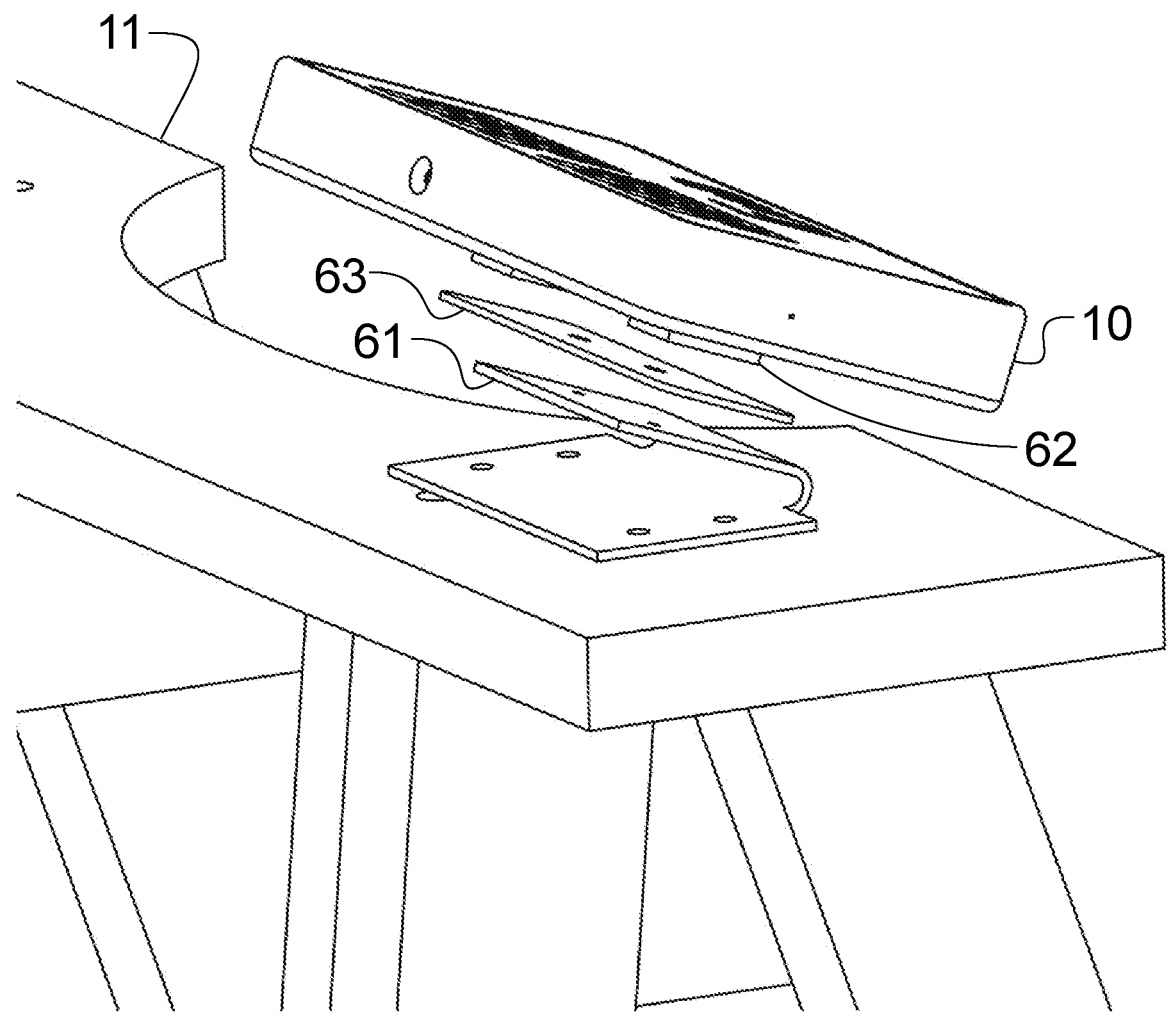
FIG. 14 is an exploded view of the golf bag stand embodiment of distance calculator embodiment of FIG. 13.
Figure 16:
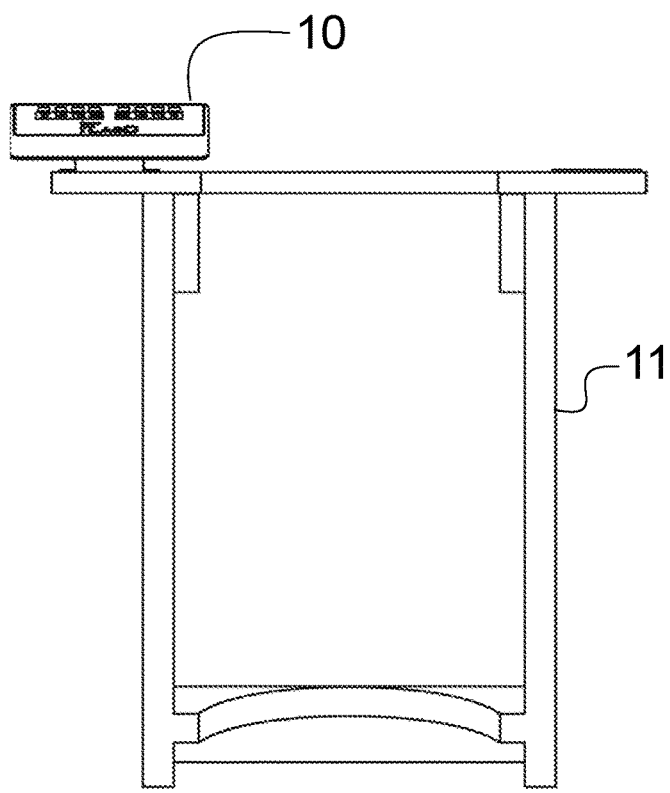
FIG. 16 is an elevation view of the golf bag stand embodiment of distance calculator embodiment of FIG. 13.
Figure 15:
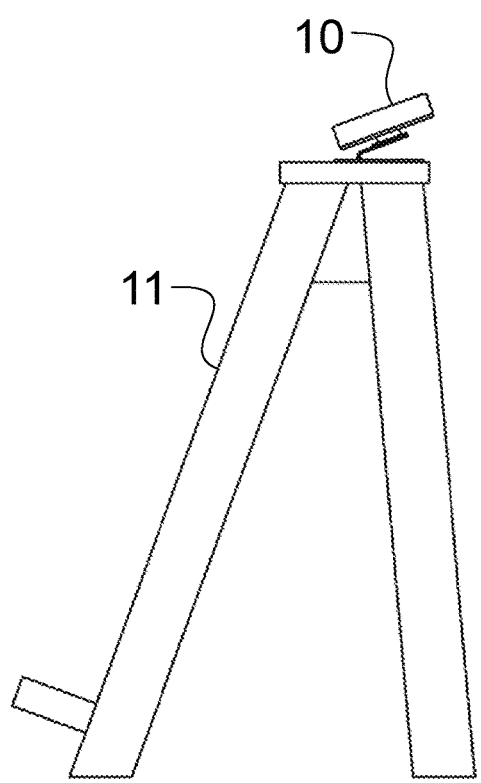
FIG. 15 is a side view of the golf bag stand embodiment of distance calculator embodiment of FIG. 13.
Figure 17:
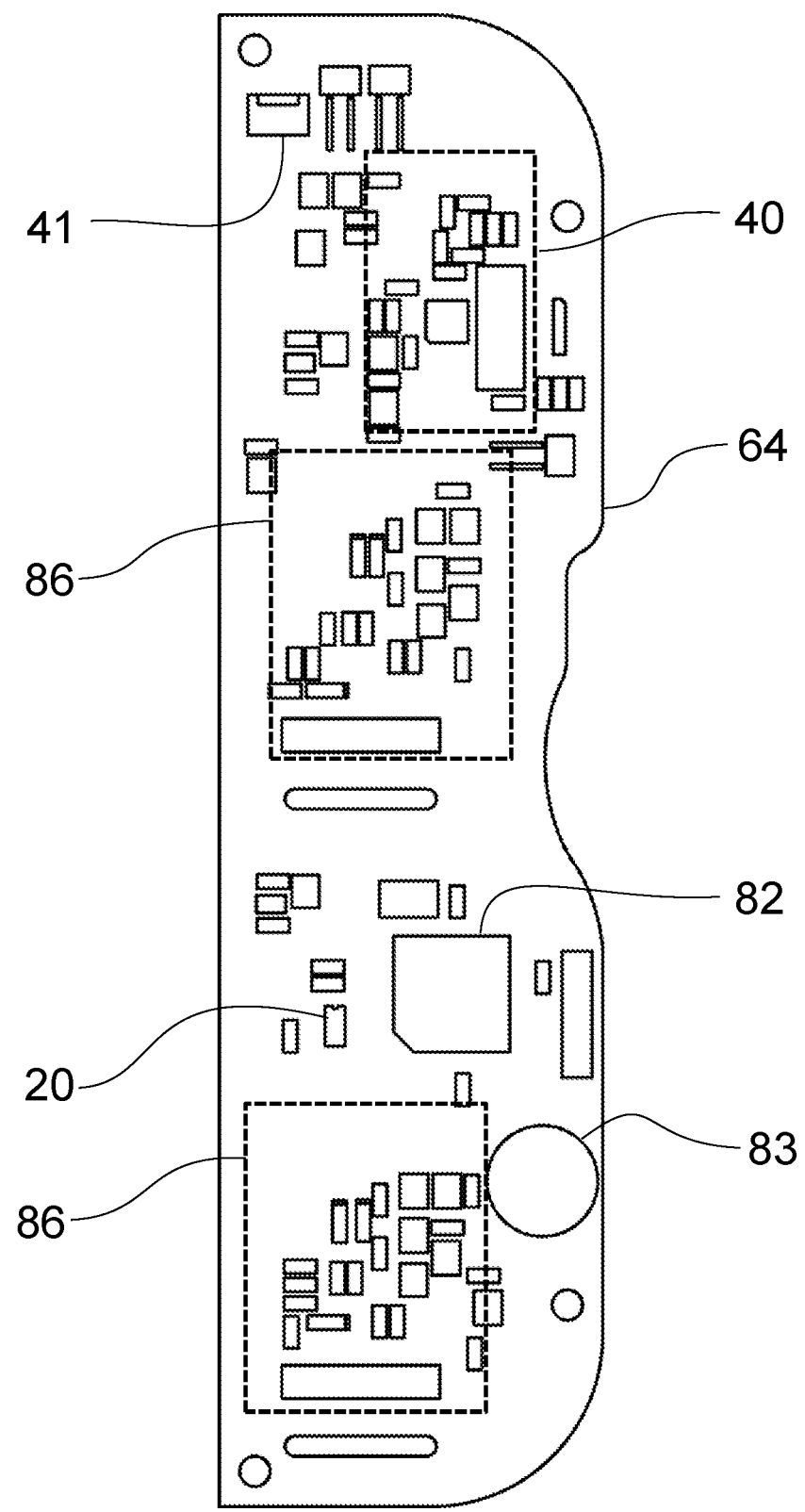
FIG. 17 is a schematic representation of a PCB embodiment of the distance calculator embodiment of FIG. 1.

In some cases, much of the functionality of the distance calculator 10 may be accomplished via electrical components disposed on the PCB 64 as shown in FIG. 17. For example, the PCB 64 may be populated with the processor such as a microprocessor 82 of the controller 18, external memory 20, power conditioning and regulation circuitry 104 (shown in FIGS. 24 and 25), display driver components 86 (shown in FIG. 17), and the wireless communication transceiver module 40 to enable wireless data transfer from one distance calculator 10 to another distance calculator 10. The housing 16 of the distance calculator 10 may be configured with water and weather resistance for continuous use in an outside environment. The microencapsulated electrophoretic display screens 34 are typically well suited for outside use due to the high contrast quality of the display when viewing in direct sunlight. In use at a golf practice range, such as a driving range, an embodiment of the distance calculator 10 may generally be mounted at or close to each hitting position 60 as shown in FIG. 12. Each distance calculator 10 may thus display the display range values from that distance calculator 10 to each fixed target flag 12 of the golf driving range 14.

In general, power management and extended batter life may be desirable features of some distance calculator embodiments 10 discussed herein. As such, for some distance calculator embodiments 10, the controller 18 may include a circuit configured to effectively disconnect the batteries from all electronics of the distance calculator 10 when the distance calculator 10 is in an inactive state where display distance yardages 33 are being displayed but no calculations or data acquisition is occurring within the device 10. When the update interface 38 is actuated by being momentarily pressed by a user, the update switch 39 completes a circuit between the batteries 52 and the PCB 64 thereby providing initial power to the microprocessor 82. During such an initialization process, the microprocessor 82 may set up a general purpose input/output (GPIO) output on a latch circuit in order to maintain power from the batteries 52 to the microprocessor 82 as well as other components of the distance calculator 10. At this point, an audible beep sound is emitted from a beeper 83 when power has been latched indicating to the user that the distance calculator 10 has been activated and the update switch 39 no longer needs to be pressed. In some cases, a user will interpret the audible beep as occurring immediately after pressing the update switch 39.

In normal operation, the GPS receiver 28 will be powered up and the microprocessor 82 will monitor incoming serial data from the GPS receiver 28 until a location fix is achieved and the incoming serial data indicated to be valid. A data collection algorithm includes a specific multi-step sequence that includes optional delays and multiple GPS receiver electrical connect/disconnect cycles to ensure that the location values for a current position of the distance calculator 10 are stable. When the current position acquisition stage is complete using the GPS receiver 28, the distances from the current position to each stored target position are calculated in the microprocessor 82 and the distance results displayed on the respective distance displays 32. After the distance displays 32 have all been updated with updated display distance values 33, the microprocessor 82 clears the GPIO output to release the battery power latch switch and the batteries 52 are then effectively disconnected from all electronics of the various circuits of the distance calculator 10 to preserve batter life.

In addition to the function of the update interface 38 discussed above, additional functionality may be accessed using the menu buttons 46, 48 and 50, to enable storing and changing the stored location data of targets 12, selecting pre-stored target locations, establishing wireless links with another distance calculator 10, changing the fonts of display distance values 33, as well as other utility features. Display fonts, target position data, and diagnostic data may be stored in the memory storage 20. The wireless link port 40 may enable wireless communication with other distance calculators 10 as well as other external devices for target position data transfer, file updates, firmware updates etc. without opening up the housing 16 of the distance calculator 10. The wired communication port 41 may be used to transfer initial factory data during a production process as well as other diagnostic functions.

Referring to FIG. 9, exemplary menu option sequences are shown for some of the functions discussed above. In particular, some embodiments of the distance calculator 10 may be operated in one of three different modes at any time. The three modes include a "default mode" which is schematically indicated by the dashed box 94, a "set target positions mode" which is schematically indicated by dashed box 96, and "menu options mode" which is indicated by dashed box 98, as shown in FIG. 9. As discussed above, when the update switch 39 is actuated, the microprocessor 82 will execute a routine to determine the location of the distance calculator 10, update the distances to all the stored target positions, and display the updated results on the distance displays 32. The microprocessor 82 will then disconnect the batteries 52 to the electronics of the distance calculator 10. In some cases, this sequence is performed automatically so the user of the distance calculator 10 can simply press the update switch 39 and walk away from the device. That is, this arrangement provides a set it and forget it type configuration for such embodiments.

In order to acquire and store target position data using the "set target positions mode" 96, a user takes the distance calculator 10 to the physical location of a target 12 and presses the update switch 39 to power up the microprocessor 82 and enter the "default mode" 94. Thereafter, the "down" button 48 of the membrane switch 42 is depressed to exit the "default mode" 94 and to enter the "set target positions mode" 96. The user then waits till an hourglass icon on one of the distance displays 32 changes from the hourglass icon to a fix icon. This change in icon status indicates that the GPS receiver has achieved a valid position data condition. The "down" button 48 is then depressed again until an indicator arrow is shown on the correct distance display 32. The correct distance display 32 would generally be the distance display 32 that is adjacent the flag indicator 36 that corresponds to the target 12 at which the distance calculator 10 is located during this process. The "up" button 46 may also be used at this stage to properly position the indicator arrow under the appropriate target indicator 36. The "enter" button 50 may then be depressed in order to store the current position data acquired by the GPS receiver into the memory storage 20 at an address that corresponds to the selected distance display 32.

The distance calculator may then be moved to the position of the next target 12 to be programmed into the distance calculator 10 and the process above repeated until the target positions of all desired targets 12 are properly stored in the memory storage 20 of the distance calculator 10. After acquiring and storing the final target position into the memory storage 20, a menu exit protocol may then be executed such as by pressing the "enter" button 50 and update switch 39 at the same time or any other designated button sequence to power down the entire distance calculator 10. Thereafter, at any desired time, the user may then take the distance calculator 10 to any desired hitting position 60 and execute the "default mode" sequence by simply pressing the update switch 39. The microprocessor 82 will then capture the current position of the distance calculator 10, calculate the distances from that current position to each of the stored target positions and then update the display distances 33 displayed on each of the programmed distance displays 32. The stored target position data acquired and stored by the preceding steps may also be transferred to other non-programmed distance calculators 10 by wireless link 40 or any other suitable method.

The "menu options mode" enables a user to execute certain other functions for utility purposes and the like. For some embodiments, the "menu options mode" include a "RxPins", "TxPins", "Reset", and "Recover" options. The "menu options mode" may be activated by pressing the update switch 39 followed by pressing the "up" button 46 of the auxiliary interface 42 in order to exit the "default mode" and enter the "menu options mode". Access to the different functions within the "menu options mode" may be achieved by using the "up" button 46 and "down" button 48 as shown in FIG. 9.

Selection of the "TxPins" option enables transmission of stored target position data to other distance calculators 10. Pressing the "enter" button 50 in this menu option causes the distance calculator 10 to "listen" for wireless requests from other distance calculator units 10. If a wireless request command is received, the microprocessor 82 will then transmit the stored target position data to the distance calculator 10 that made the request and then wait for the other unit to echo back the transmitted dataset. The returned dataset will be compared to the sent dataset and if there is a match, a confirmation acknowledgement string will be sent. If there is not a match, the microprocessor 82 will repeat the transmit/verify cycle until no errors are detected or until a maximum number of retries have been executed. To exit the "TxPins" mode, any key may be pressed. The microprocessor will update the distance displays 32 then power down as discussed above.

The "RxPins" mode enables the distance calculator 10 to receive stored target position data from another distance calculator 10. To receive stored target position data from another distance calculator 10 in "TxPins" mode, the "enter" button 50 may be pressed while in the "RxPins" mode. The wireless transfer process discussed above may then be executed. The "Reset" menu option will clear all stored target position data from the memory storage 20 of the distance calculator 10. Pressing the "enter" button 50 while in the "Reset" menu option will clears all stored target position data, updates the distance displays 32 and powers down the distance calculator 10. Actuation of the "Recover" menu option will undo the "Reset" function, update the display then power down the distance calculator 10.

For some distance calculator embodiments 10, an order of assembly of the distance calculator 10 may be as follows. Initially, firmware may be downloaded to the microprocessor 82 on the PCB 64 and data downloaded into the external memory storage 20 on PCB 64. The two microencapsulated electrophoretic display screens 34 are then attached and operatively coupled to the PCB 64 and the two battery holders 66 coupled to the case bottom 44. The membrane switch 42 may be attached to the case bottom 44. The PCB 64 is secured to the case bottom 44. The faceplate 54 is attached to the case top 68 and four AA batteries 52 installed into the battery holders 66. The GPS receiver 28 is secured to the non-metallic backside surface of the faceplate 54 centered inside the opening in the top case 68. Connectors from the two battery holders 66, the membrane switch 42, the update switch 39, and the GPS receiver 28 are operatively coupled to mating connectors on the PCB 64. The case sealing O-ring 70 is secured to the case bottom 44 and the case top 68 (shown in FIG. 7) attached to the case bottom 44 using a plurality of case assembly screws 72, Finally, the mount magnets 62 may be secured to the case bottom 44 with screws or any other suitable fastener.

Since the purpose of some distance calculator embodiments 10 may typically include displaying distances from the distance calculator 10 to a distant target 12 (such as a flag on a golf practice range), a golfer 78 that is a client or customer of a golf practice facility may use the distance calculator 10 by simply reading the display distance yardage values 33 displayed on the distance displays 32 of the distance calculator 10 for the target 12 of interest with the distance calculator 10 disposed at or near the hitting position 60 of the golfer 78. The golfer 78 may then select the appropriate golf club and swing intensity to hit a golf ball to the target 12 of interest based on the displayed distance yardage value of the target 12. A "service oriented" user, such as a greenskeeper of a golf practice range, may use embodiments of the distance calculators 10 discussed herein to reduce the amount of time and energy required to supply their customers with accurate distance measurements to the multiple targets 12 of the golf practice ranges 14 that they operate.

Figure 10:
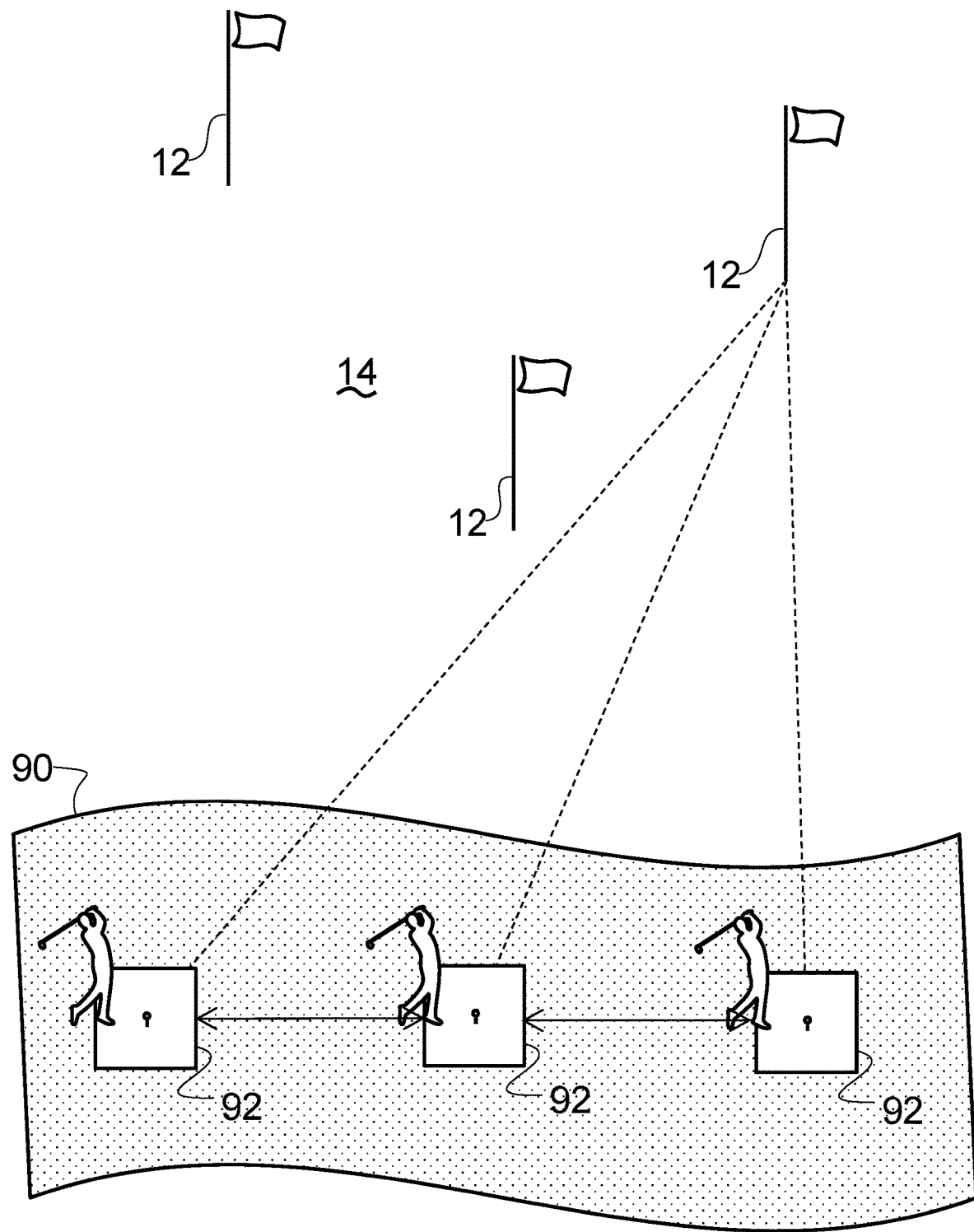
FIG. 10 is a schematic view of a golf practice range embodiment illustrating a varying effective distance to a single target from three different hitting stations located at different positions.

Referring to FIG. 10, it can be seen that at a typical golf practice range 14, designated hitting stations 92 may be arranged in a substantially equidistant side by side linear formatting along a hitting line which keeps the golfers 78 aligned with the targets 12 of the golf practice range 14 and avoids golfers 78 from hitting towards each other. However, this linear arrangement results in each hitting station 92 being disposed at distances from the targets 12 that are different than the distances from the targets 12 of other hitting stations 92. As such, each hitting station has a unique set of distance yardage values relative to each of the targets 12 of the golf practice range 14. As such, it is desirable for the distance yardage values used by a golfer 78 at a given hitting station 92 to be calculated specifically for that particular hitting station 92.

In addition, as discussed above, the hitting position 60 of a golfer 78 in the context of a golf practice range will be a position from which a golfer 78 will typically take multiple practice shots such as by hitting a bucket of range balls often with a variety of clubs from that same hitting position 60. In some cases, a golfer 78 may take 10 or more shots from such a single hitting position 60 of a golf practice range 14. Sometimes, at least 20, 50 or 100 shots or more may be taken by a golfer 78 at a single hitting position 60 at a golf practice range 14 depending on a particular golfer's stamina, goals, perseverance etc. This is generally in contrast to play carried out on a regulation golf course where it is anticipated (and desirable) for the golfer 78 to take no more than one shot from a given hitting position 60 on the regulation golf course during play.

Figure 11:
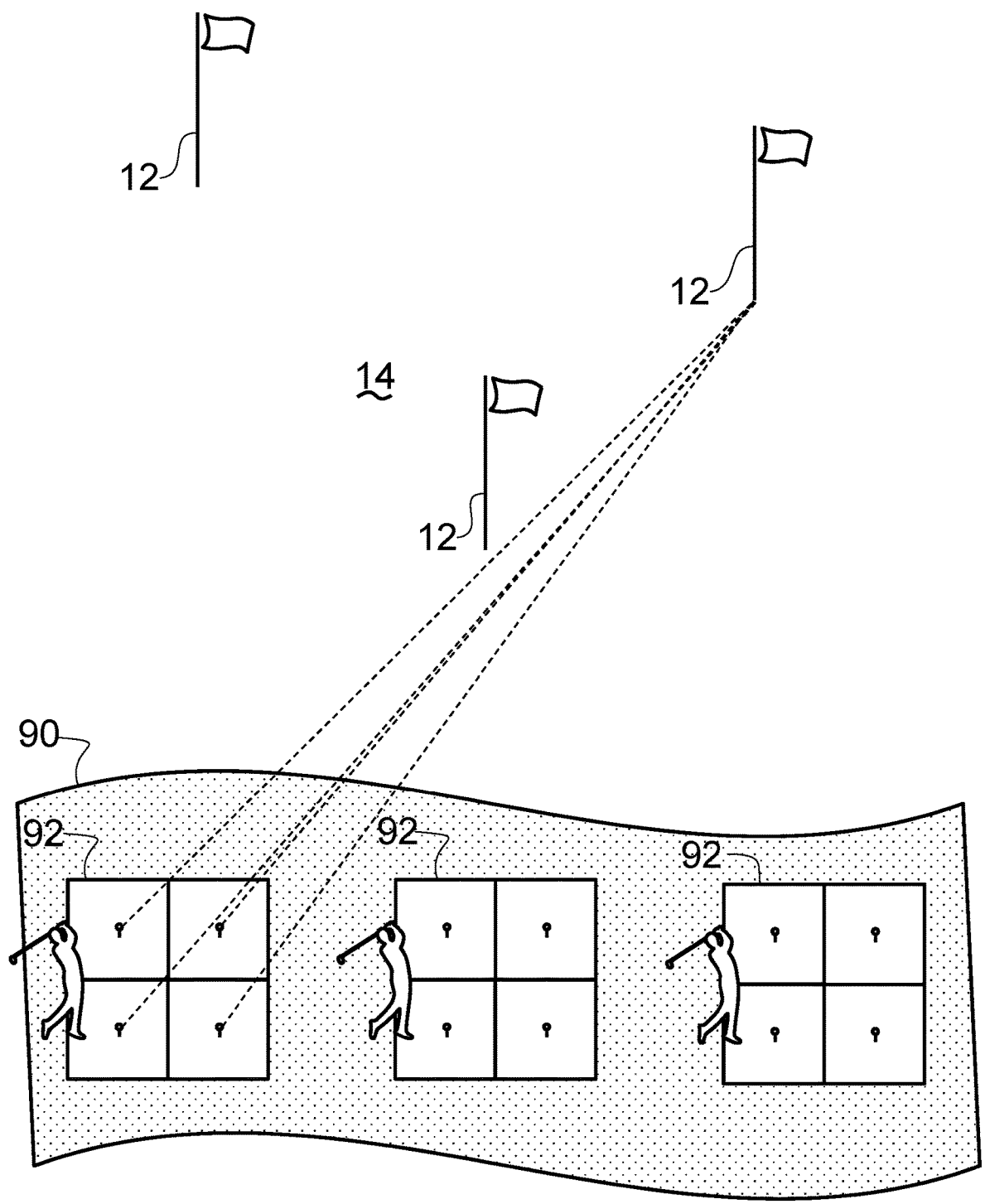
FIG. 11 is a schematic view of golf practice range embodiment illustrating varying effective distance to a single target from four different hitting zones "a", "b", "c", and "d" of the same hitting station.

As such, when multiple hits such 10 or more hits are deliberately taken from a single hitting position 60 on a golf practice course 14, it may be desirable to rotate and reposition the hitting position 60 at regular intervals, particularly where the hitting position 60 is disposed on a natural living grass surface 90, as shown in FIG. 11. This rotation of the hitting position 60 may be performed in order to let the natural grass surface 90 of a hitting station 92 recover and rejuvenate at the position of the most recent hitting position 60. It should be noted that the location of the hitting positions 60 of a golf practice range 14 may also be relocated or otherwise moved for any other reason such as a course redesign and the like.

FIG. 11 shows a grass practice area that includes multiple hitting stations 92. Each hitting station for the practice area shown includes four exemplary hitting zones which are labeled a, b, c and d within which the hitting position 60 and distance calculator 10 may be disposed. As such, if on day one the hitting positions at the hitting stations 92 or any subset thereof are all disposed within respective hitting zones "a", the following day, or interval of multiple days, those same hitting positions 60 and associated distance calculators 10 may be relocated to respective hitting zones "b" and so on until the grass quality in the "a" hitting zones has recovered and the hitting positions 60 and associated distance calculators 10 may be rotated back to the "a" hitting zones and the process then started over. In some cases, the hitting positions 60 may just be moved front to back ("a" to "d", then "d" to "a" for example) or side to side ("a" to "b" then "b" to "a" for example), but they may also be rotated around the entire hitting station 92 such as in an "a" to "b", "b" to "c", "c" to "d" and back to "a" pattern.

Referring to FIG. 12, upon such relocation, each of the distance calculators 10 disposed at each of the respective relocated hitting positions 60 on the golf practice range 14 may then be updated by simply actuating the update interface 38. Upon such actuation of the update interface 38, the GPS receiver 28 will acquire the position of the distance calculator 10 at the new hitting position 60 and then recalculate and update the displayed distance yardage values 33 on the respective distance displays 32. It should be noted that this step of updating the displayed yardage distances 33 for the new relocated location of the hitting position 60 and corresponding distance calculator 10 is made more efficient and convenient with regard to time and power consumption by virtue of the microprocessor reusing the previously acquired position/coordinate data for each of the plurality of stored target positions of some or all of the targets 12 of the golf practice range 14. As such, upon actuation of the update interface 38, the GPS receiver 28 temporarily uses stored energy from the batteries 52 to reacquire the new position of the distance calculator 10, and the microprocessor 82 uses stored energy from the batteries 52 to recalculate the updated display distance yardage values 33, however, no stored energy is required in order to reacquire the position data for each of the targets 12 for which display distance yardage values 33 are being displayed. In addition, once the updated display distance yardage values 33 have been displayed on the respective distance displays 32 of the distance calculator 10, power to the entire electrical and electronic system may be shut off automatically to eliminate any further power consumption once updated.

Another efficiency associated with the system of the use of multiple distance calculator embodiments 10 discussed herein, is that they may be essentially interchangeable for the golf practice range management or any other user or owner of multiple distance calculators 10. For example, at the end of operating hours of a golf practice range facility that utilizes about 5 distance calculators to about 30 distance calculators or more, the greenskeeper or other person in charge of maintaining the golf practice range may physically gather the multiple distance calculator embodiments 10 from the respective multiple hitting positions 60 and return the devices to the clubhouse in a suitable container. The following day, prior to opening, the greenskeeper may take the container of multiple distance calculators 10 out to the hitting stations 92, and re-secure any of the distance calculators in the container to the golf bag stand 11 of any of the respective hitting positions 60 on the range and then updating each of the re-secured distance calculators 10 by actuation of the update interface 38 of each. The distance calculators 10 are completely interchangeable because they each have the same stored target position data/coordinates stored in the memory storage 20. As such, there is no need for the greenskeeper to keep track of which distance calculator 10 is associated with a particular hitting station 92.

Another feature that may produce similar convenience and efficiency for a commercial user of multiple distance calculator embodiments 10 is the ability to store target position data for targets 12 that are stored in an inactive state and for which no yardage distance calculations are made by the microprocessor 82 upon actuation of the update interface 38. This allows the golf practice course management to store target position data for the targets 12 of multiple practice range configurations and then having the option of whether or not to calculate and display distances based on this stored data depending on whether or not the stored data is set to an active state or inactive state. This feature may be useful for golf facilities that put on special events on occasion that require an alternative configuration to the golf practice range 14. Youth events, certain weather changes or patterns or the like may be exemplary scenarios requiring an alternative configuration or layout of various targets 12.

Also as discussed above, some embodiments of a method of calculating and simultaneously displaying a plurality of yardage distances measured from a plurality of targets 12 on a golf practice range 14 to a distance calculator 10, may include positioning the distance calculator 10 at a first target 12 of a golf practice range 14 and initiating GPS calculation by the GPS receiver 28 the distance calculator 10 of a first target position by receiving GPS satellite signal data from at least three GPS satellites with the antenna 30 of a GPS receiver 28 of the distance calculator 10 and determining the coordinates of the first target position while the distance calculator 10 is positioned at the first target 12. Thereafter, the first target position may be stored into the memory storage 20 of the distance calculator 10 in a storage location or address associated with a first distance display of the distance calculator 10.

After storing the first target position, the distance calculator 10 may be positioned at a second target 12 of a golf practice range 14. After so positioning the distance calculator 10, GPS calculation may be initiated by the GPS receiver 28 of the distance calculator 10 to determine a second target position by again receiving GPS satellite signal data from at least three GPS satellites with the antenna 30 of the GPS receiver 28 of the distance calculator 10 and thereafter determining the coordinates of the second target position while the distance calculator 10 is positioned at the second target 12. Once the second target position has been determined, the second target position may be stored into the memory storage 20 of the distance calculator 10 in a storage location or address associated with a second distance display 32 of the distance calculator 10. In some cases, about 2 target positions to about 20 target positions may be determined by the GPS receiver 28 and stored in the memory storage 20, however, any suitable or desirable plural number of target positions may be acquired and so stored. For example, in some cases, about 3 target positions to about 12 target positions may be determined and stored in the memory storage 20.

After storing the second target position, the distance calculator 10 may then be positioned at a hitting position 60 on the golf practice range 14 and an update command of the distance calculator 10 initiated by actuation of the update interface switch 39. The determination of the hitting position 60 is made by initiating GPS calculation of the hitting position 60 and again receiving GPS satellite signal data from at least three GPS satellites with the antenna 30 of the GPS receiver 28 of the distance calculator 10 and determining the hitting position 60 with the distance calculator 10 disposed at the hitting position 60. Once the hitting position 60 has been determined by the GPS receiver 28, a first display distance value 33 measured between the first target position 12 and the hitting position 60 may be calculated with the microprocessor 82 of the distance calculator 10. A second display distance value 33 measured between the second target position 12 and the hitting position 60 may also be calculated with the microprocessor 82 of the distance calculator 10. Thereafter, the first display distance value 33 may be displayed on the first distance display 32 of the distance calculator 10 and the second display distance value 33 may be displayed on the second distance display 32 of the distance calculator 10. In some cases, in order to conserve stored power and increase battery life, power to the first distance display 32 and the second distance display 32 may be discontinued after displaying the first display distance value 33 on the first distance display 32 and displaying the second display distance value 33 on the second distance display 32.

In some instances, for distance calculator embodiments that include a communication link 40, the stored target positions through the communication link 40 of the distance calculator 10 to a communication link 40 of a second distance calculator 10. For embodiments wherein the respective communication links 40 include wireless communication links, the stored target positions may be transmitted wirelessly. It should be noted that such transmission of stored target positions may be transmitted through respective communication links 40 from any distance calculator 10 to any number of other distance calculators 10 that are suitably equipped with a communication links 40 which are configured to transmit and receive from the host distance calculator 10. It should also be noted that the transmission of stored target positions and/or other internal data may be carried out between one or more distance calculators and an external data aggregator, data processor, or network communication link.

As discussed above and illustrated in FIG. 9, embodiments of an update procedure for updating display distances of a distance calculator may include the following steps. After the distance calculator embodiment is moved to a different hitting position, an update sequence may be initiated by depressing the recessed switch using a golf tee or by any other suitable method. The controller of the distance calculator may then automatically re-calculate the new distances and update the display distances. Embodiments of an initial setup of a single distance calculator may include the following steps. To determine the positions of the targets (such as flags on the golf driving range), a single distance calculator may be physically taken to a target. The position coordinates of the target are then captured by the GPS receiver using menu commands on the display accessed by pressing the buttons on the membrane switch. This procedure may be repeated to capture the remote position coordinates for each fixed flag target. This single distance calculator may then be returned and mounted back to its reference location (such as on the golf bag stand 11) near the hitting position of the golfer 78. The update procedure described above may then performed and the distance calculator will display the display distances to the plurality of target flags.

Embodiments of methods for initial setup of multiple distance calculators may include the following procedure. When multiple distance calculators are utilized (as would be the typical case of providing at least one distance calculator at each of a plurality of hitting positions at a golf practice range), the location coordinates of each desired target may be stored into the memory storage of multiple distance calculators. This may be accomplished by first initializing a single distance calculator as discussed above. The stored target positions stored in the single initialized distance calculator may then be wirelessly transferred to each additional distance calculator using menu commands accessed by pressing the appropriate buttons on the membrane switch.

Figure 19:
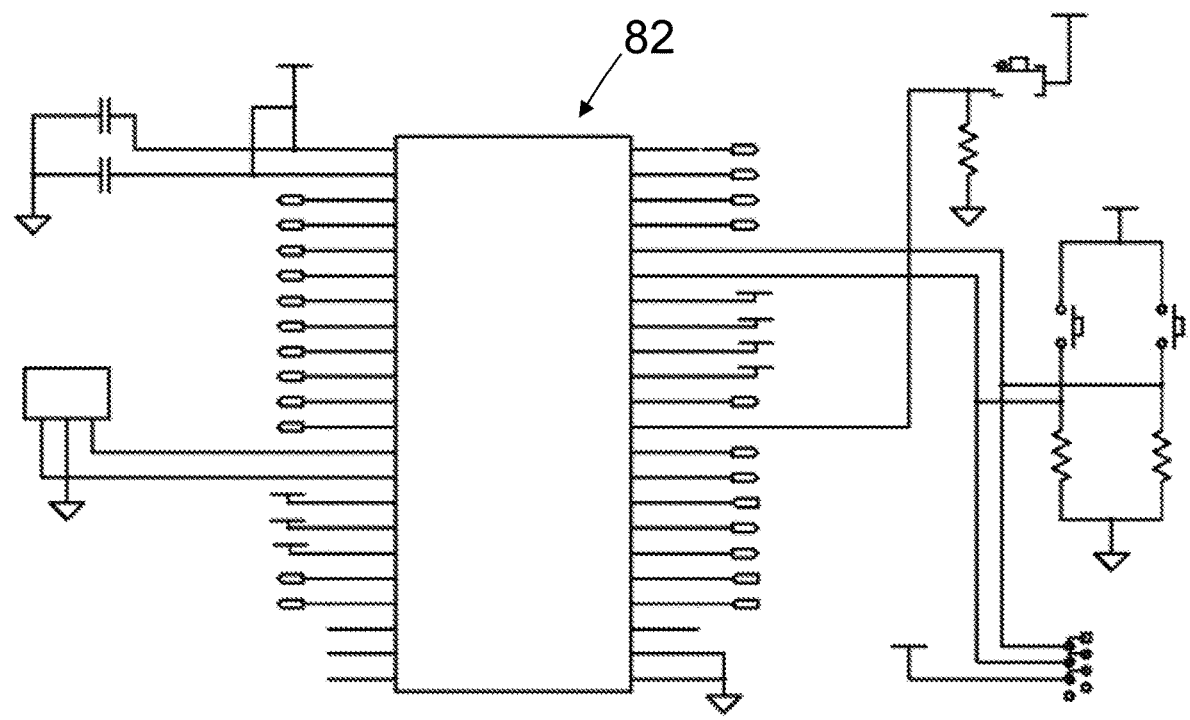
FIG. 19 illustrates an embodiment of the microprocessor.
Figures 18, 20, 21:
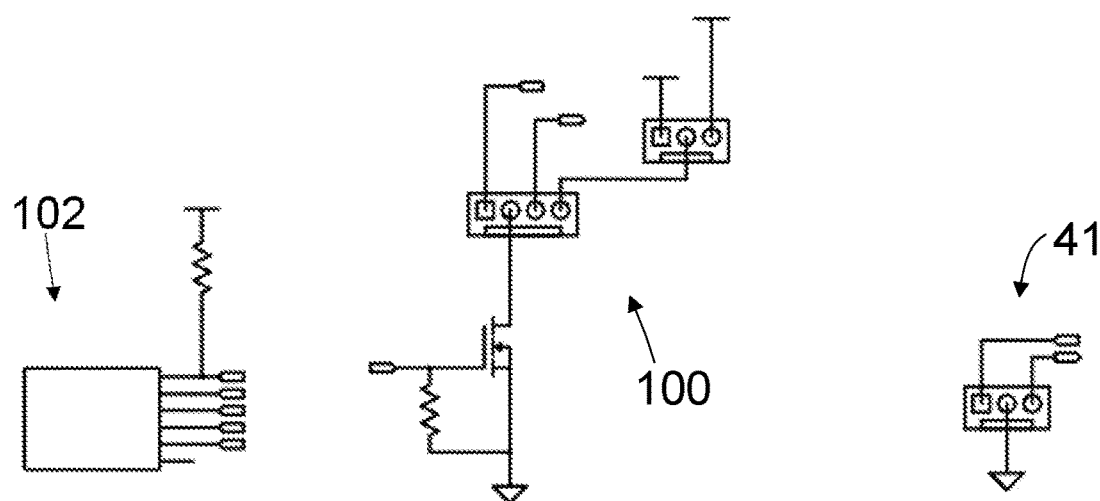
FIG. 18 illustrates an embodiment of a microprocessor programming port which may be used as an interface to load firmware into the microprocessor.
FIG. 20 illustrates an embodiment of a GPS receiver interface circuit.
FIG. 21 shows an embodiment of a wired port connector circuit.

FIGS. 18-32 are circuit diagrams of various exemplary circuits of the distance calculator embodiment 10. FIG. 18 illustrates an embodiment of a microprocessor programming port 102 which may be used as an interface to load firmware into the microprocessor 82. FIG. 19 illustrates an embodiment of the microprocessor 82 which may be a key component of the controller 18 and which may be used to control all operation and user interface circuits to detect interaction with interface buttons 39, 46, 48, and 50. FIG. 20 illustrates an embodiment of a GPS receiver interface circuit 100 which operatively couples the GPS receiver 28 to the microprocessor 82. FIG. 21 shows an embodiment of a wired port connector circuit that enables factory level communication with the microprocessor 82 as well as other components for initial configuring and diagnostics. FIG. 22 shows an embodiment of an EEPROM memory storage 20. FIG. 23 illustrates an embodiment of a beeper 83 and associated circuitry. FIG. 24 shows an embodiment of a soft power circuit 104 for a left side display screen 34 and FIG. 25 shows an embodiment of a soft power circuit 104 for a right side display screen 34, each or which may be used to condition voltage rise during power up of each respective display screen 34.

Figure 26:
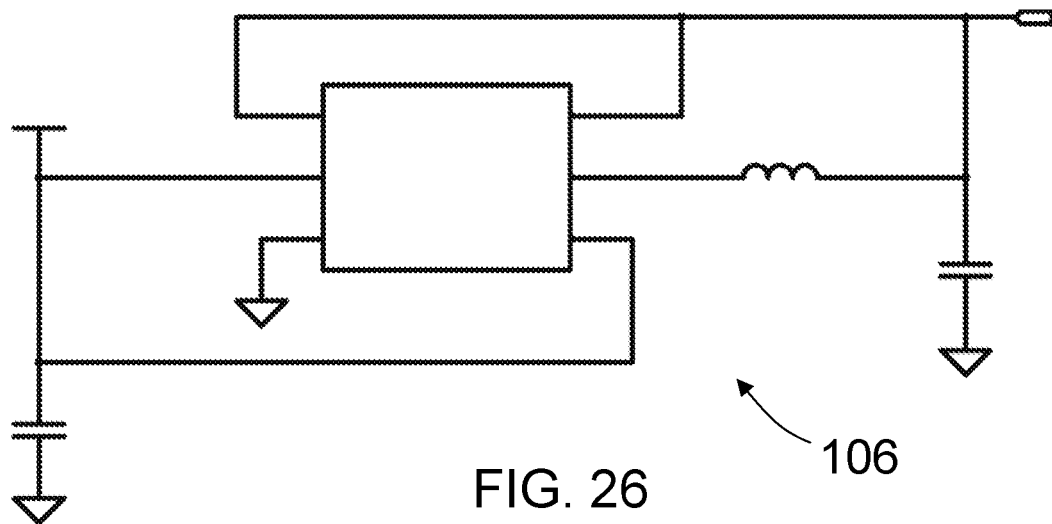
FIG. 26 shows an embodiment of a 3.3 volt boost voltage regulator circuit.
Figure 27:
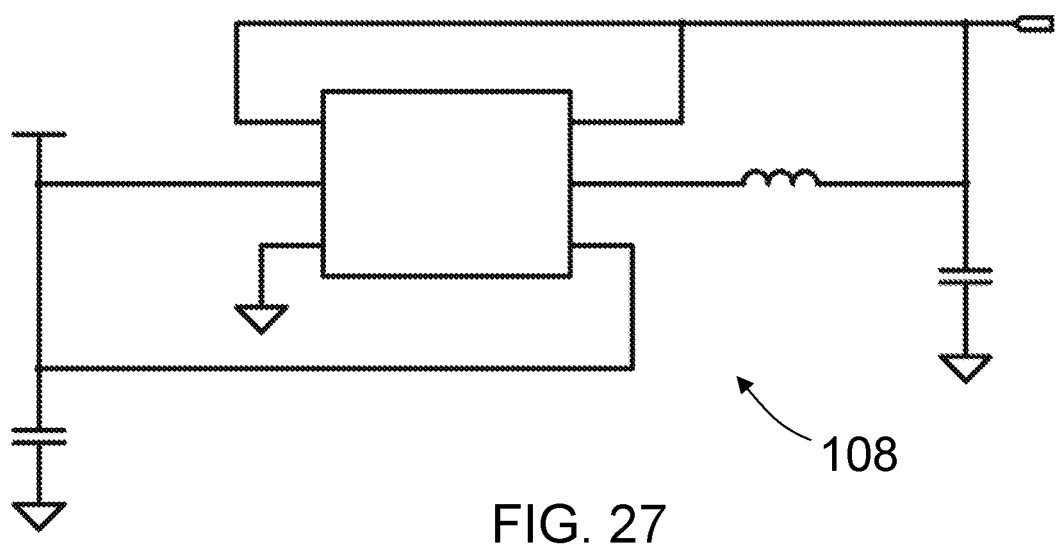
FIG. 27 illustrates an embodiment of a 5 volt voltage regulator circuit.
Figure 29:
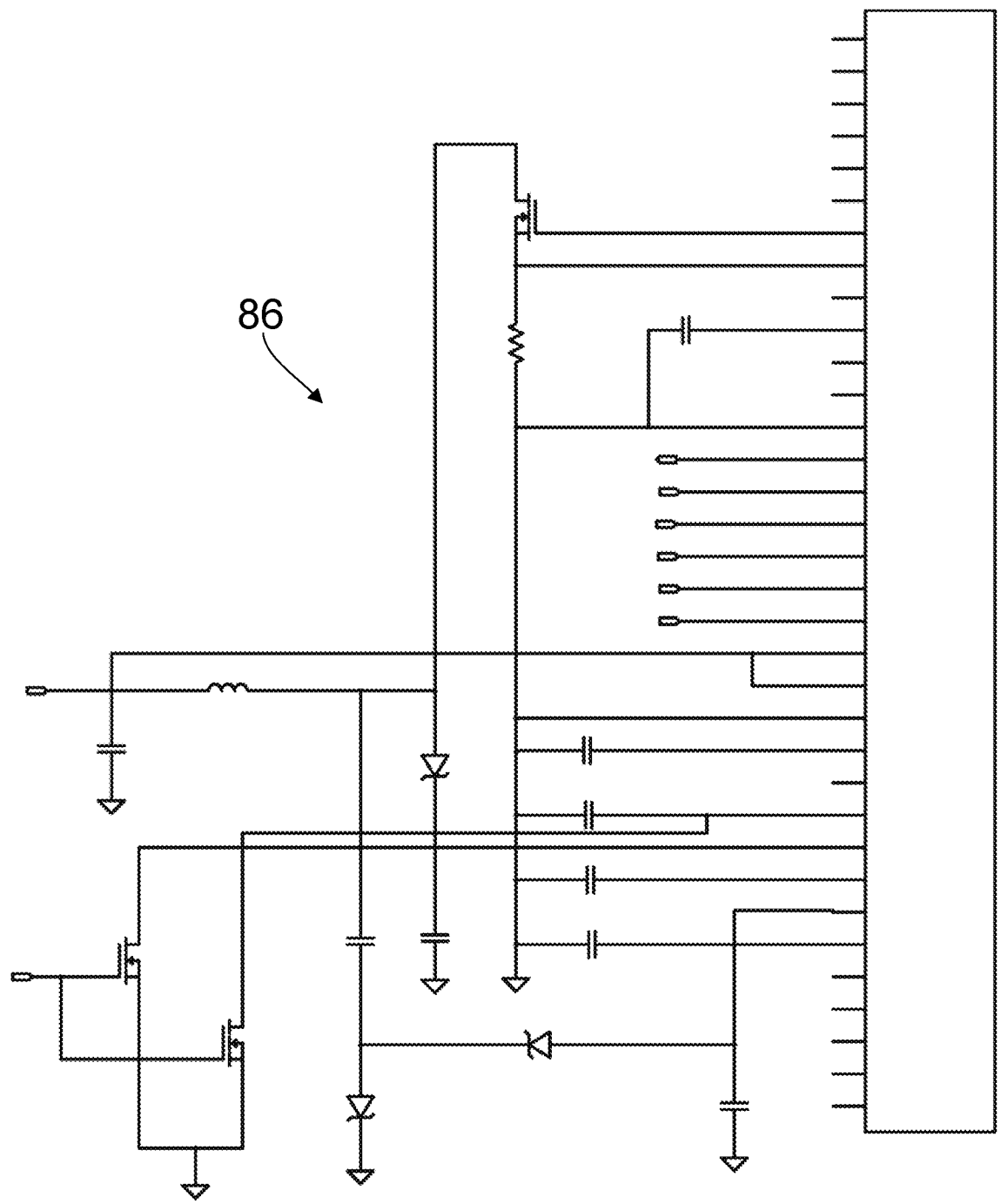
FIG. 29 shows an embodiment of a driver circuit of the left side display screen.
Figure 30:
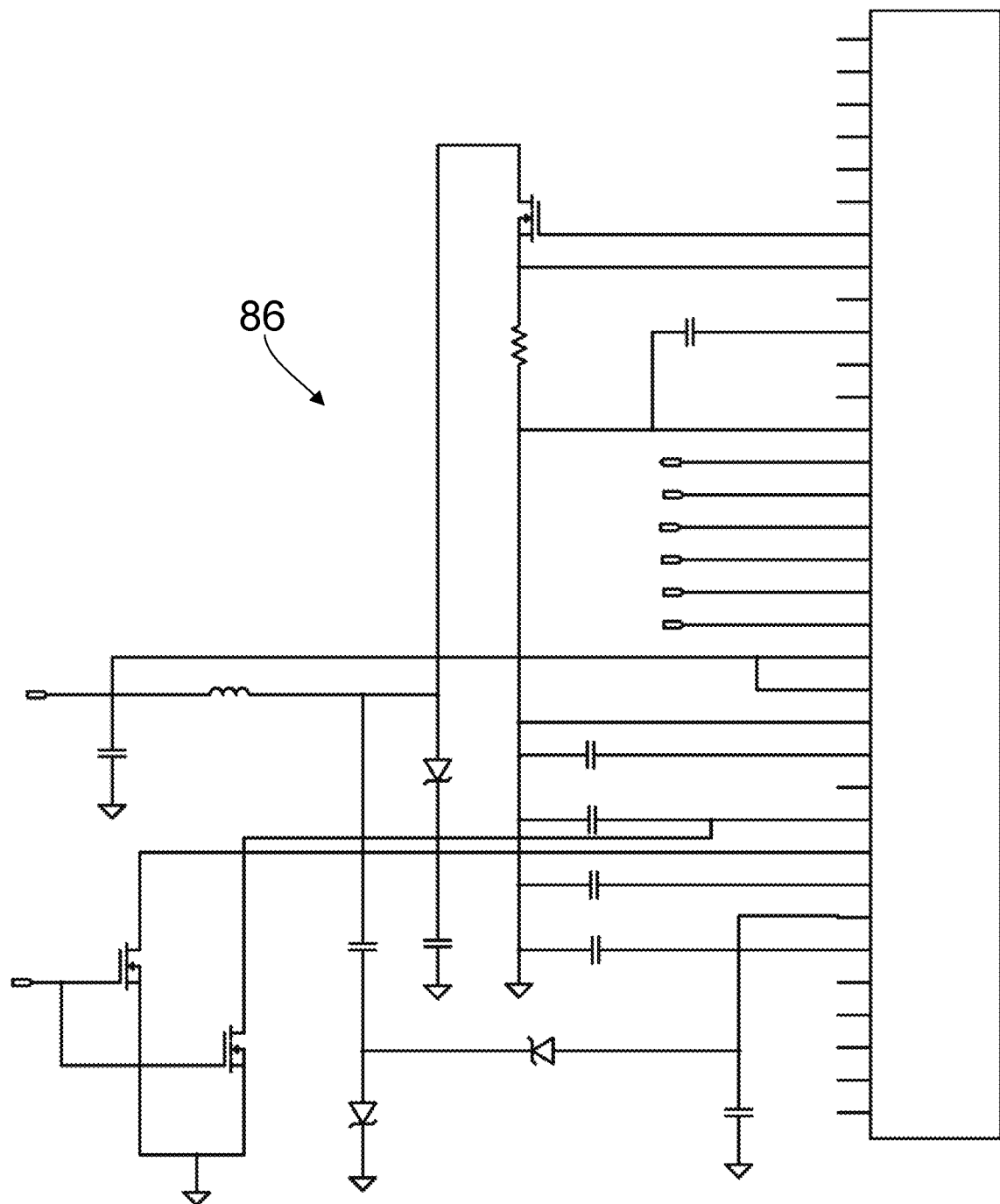
FIG. 30 shows an embodiment of a driver circuit that may be used to drive the right side display screen.
Figure 31:
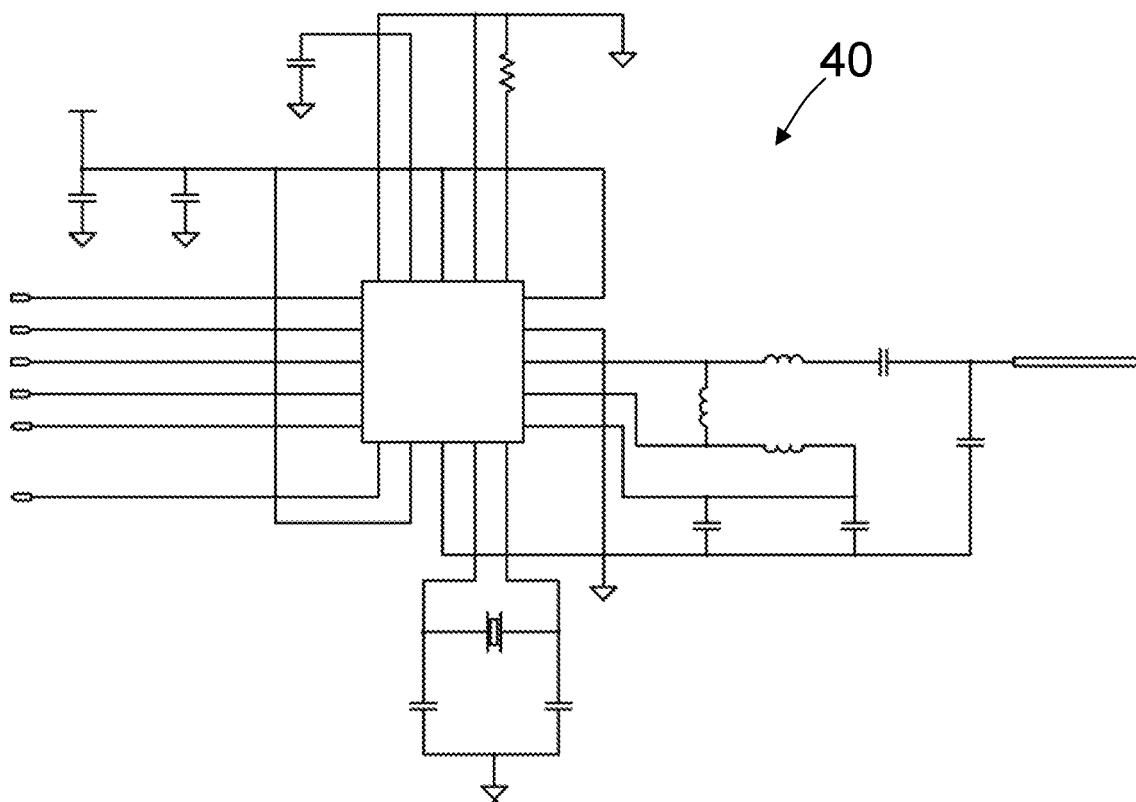
FIG. 31 illustrates an embodiment of the wireless link.
Figure 32:
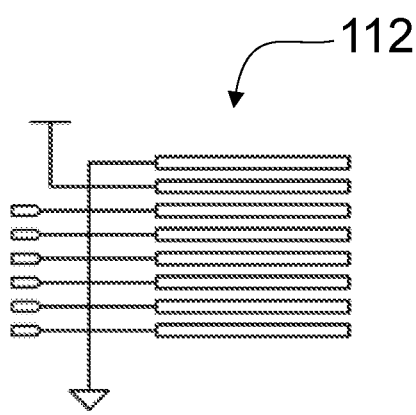
FIG. 32 shows an embodiment of a wireless communication access connector circuit.

FIG. 26 shows an embodiment of a 3.3 volt boost voltage regulator circuit 106 that provides regulated power to components of the distance calculator that require 3.3 volts. FIG. 27 illustrates an embodiment of a 5 volt voltage regulator circuit 108 that provides regulated 5 volt power to the GPS receiver 28. FIG. 28 illustrates an embodiment of a battery input connector circuit 110 that connects battery 52 to PCB 64. FIG. 29 shows an embodiment of a driver circuit 86 of the left side display screen 34. FIG. 24 shows an embodiment of a driver circuit 86 that may be used to drive the right side display screen 34. FIG. 31 illustrates an embodiment of the wireless link 40 which may be used to provide wireless communication from the distance calculator 10 to other devices without a direct wired connection. FIG. 32 shows an embodiment of a wireless communication access connector circuit 112 that may be used as a diagnostic port for the wireless link 40.

Embodiments illustratively described herein suitably may be practiced in the absence of any element(s) not specifically disclosed herein. Thus, for example, in each instance herein any of the terms "comprising," "consisting essentially of," and "consisting of" may be replaced with either of the other two terms. The terms and expressions which have been employed are used as terms of description and not of limitation and use of such terms and expressions do not exclude any equivalents of the features shown and described or portions thereof, and various modifications are possible. The term "a" or "an" can refer to one of or a plurality of the elements it modifies (e.g., "a reagent" can mean one or more reagents) unless it is contextually clear either one of the elements or more than one of the elements is described. Thus, it should be understood that although embodiments have been specifically disclosed by representative embodiments and optional features, modification and variation of the concepts herein disclosed may be resorted to by those skilled in the art, and such modifications and variations are considered within the scope of this disclosure.

With regard to the above detailed description, like reference numerals used therein refer to like elements that may have the same or similar dimensions, materials and configurations. While particular forms of embodiments have been illustrated and described, it will be apparent that various modifications can be made without departing from the spirit and scope of the embodiments of the invention. Accordingly, it is not intended that the invention be limited by the forgoing detailed description.

What is claimed is:

1. A distance calculator for simultaneously displaying distances to a plurality of targets at a golf practice range, comprising:
    a housing;
    memory storage which is disposed on the housing and which is configured to store a plurality of stored target positions;
    a global positioning system receiver which determines a position of the distance calculator by receiving global positioning system satellite signal data;
    a controller which is in operative communication with the memory storage and global positioning system receiver and which calculates a distance from each of a plurality of targets to the distance calculator based on respective stored target positions of the plurality of targets that are stored in the memory storage;
    a stored power source disposed on the housing;
    a plurality of distance displays which are each in operative communication with the controller, which are each disposed on the housing, which each display a display distance corresponding to a stored target position of a corresponding target and which each are visible to a user from a position outside of the housing;
    a target indicator disposed on the housing adjacent each of the plurality of distance displays; and
    an update interface which is in operative communication with the controller and which prompts the controller to automatically initiate calculation of display distances between each of the stored target positions to the position of the distance calculator, update the display distances on each of the respective distance displays based on the calculated display distances, and then decouple the stored power source so as to put the distance calculator into an inactive state wherein the display distances are being displayed but no calculations or data acquisition is occurring within the distance calculator.

2. The distance calculator of claim 1 wherein the update interface comprises a button disposed on the housing.

3. The distance calculator of claim 2 wherein the button disposed on the housing comprises a recessed mechanical button which is positioned within the housing so as to permit actuation of the recessed mechanical button with a point of a golf tee.

4. The distance calculator of claim 1 wherein the update interface comprises a remote control.

5. The distance calculator of claim 4 wherein the update interface comprises a wireless link in wireless communication with the remote control.

6. The distance calculator of claim 1 further comprising an auxiliary user interface operatively coupled to the controller.

7. The distance calculator of claim 6 wherein the auxiliary user interface comprises a membrane switch disposed on the housing.

8. The distance calculator of claim 1 wherein each target indicator comprises a color coded emblem.

9. The distance calculator of claim 8 wherein each color coded emblem corresponds to a color coding of a flag corresponding to a stored target position for which the display distance has been displayed.

10. The distance calculator of claim 1 wherein each target indicator comprises a written character that represents a matching written character of a corresponding target.

11. The distance calculator of claim 10 wherein the written characters comprise numbers.

12. The distance calculator of claim 10 wherein the written characters comprise letters.

13. The distance calculator of claim 1 wherein each of the distance displays comprise a screen that continues to display the display distance after power to the distance displays has been stopped.

14. The distance calculator of claim 13 wherein each of the distance displays comprise a microencapsulated electrophoretic display.

15. The distance calculator of claim 1 wherein the plurality of distance displays are disposed on a single display screen.

16. The distance calculator of claim 1 wherein the plurality of distance displays are disposed on a plurality of display screens.

17. The distance calculator of claim 16 wherein the plurality of distance displays are each disposed on a separate display screen.

18. The distance calculator of claim 1 further comprising a mount.

19. The distance calculator of claim 18 wherein the mount comprises a magnetic mount.

20. The distance calculator of claim 1 comprising 2 distance displays to 20 distance displays.

21. The distance calculator of claim 1 wherein the stored power source comprises a battery.

22. The distance calculator of claim 21 wherein the battery comprises a rechargeable battery.

23. The distance calculator of claim 1 wherein the housing comprises an enclosed hollow configuration.

24. The distance calculator of claim 23 wherein the housing is weatherproof.

25. The distance calculator of claim 23 wherein the housing is rectangular with a thickness that is less than a height or width.

26. The distance calculator of claim 1 wherein the memory storage comprises electrically erasable programmable read-only memory.

27. The distance calculator of claim 1 further comprising a communication link that is operatively coupled to the controller and that is configured to transmit stored target position data to a communication link of another distance calculator that is configured to receive stored target position data.

28. The distance calculator of claim 23 wherein the communication link comprises a wireless link.

29. The distance calculator of claim 1 wherein the housing further comprises a display window disposed over the distance displays.

* * * * *